(12) United States Patent
Li et al.

(10) Patent No.: US 11,876,970 B2
(45) Date of Patent: Jan. 16, 2024

(54) NON-INTERLEAVED SEPARATE TREE

(71) Applicant: Tencent America LLC, Palo Alto, CA (US)

(72) Inventors: Xiang Li, Saratoga, CA (US); Guichun Li, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/867,349

(22) Filed: Jul. 18, 2022

(65) Prior Publication Data

US 2023/0026013 A1   Jan. 26, 2023

Related U.S. Application Data

(60) Provisional application No. 63/224,767, filed on Jul. 22, 2021, provisional application No. 63/224,771, filed on Jul. 22, 2021.

(51) Int. Cl.
| | |
|---|---|
| *H04N 19/00* | (2014.01) |
| *H04N 19/132* | (2014.01) |
| *H04N 19/137* | (2014.01) |
| *H04N 19/176* | (2014.01) |
| *H04N 19/169* | (2014.01) |

(Continued)

(52) U.S. Cl.
CPC ......... *H04N 19/132* (2014.11); *H04N 19/137* (2014.11); *H04N 19/176* (2014.11); *H04N 19/186* (2014.11); *H04N 19/1883* (2014.11); *H04N 19/96* (2014.11)

(58) Field of Classification Search
CPC .. H04N 19/132; H04N 19/137; H04N 19/176; H04N 19/186; H04N 19/1883; H04N 19/96
See application file for complete search history.

(56) References Cited

U.S. PATENT DOCUMENTS

| | | | |
|---|---|---|---|
| 2013/0272380 A1* | 10/2013 | Chien | H04N 19/70 375/240.02 |
| 2019/0349592 A1* | 11/2019 | Xu | H04N 19/176 |

(Continued)

FOREIGN PATENT DOCUMENTS

| | | |
|---|---|---|
| CA | 2867764 A1 | 10/2013 |
| WO | 2019217189 A1 | 11/2019 |
| WO | 2021037004 A1 | 3/2021 |

OTHER PUBLICATIONS

International Search Report and Written Opinion dated Oct. 13, 2022 in Application No. PCT/US2022/073907. (64 pages).

*Primary Examiner* — Zhihan Zhou
(74) *Attorney, Agent, or Firm* — ARENTFOX SCHIFF LLP

(57) ABSTRACT

Aspects of the disclosure provide methods and apparatuses for video encoding/decoding. In some examples, an apparatus for video decoding includes processing circuitry. The processing circuitry determines that a non-interleaved separate tree structure is used for coding different color components of coding tree units (CTUs) in a bitstream. The processing circuitry decodes a first color component of a plurality of CTUs from a first portion of the bitstream, and decodes a second color component of the plurality of CTUs from a second portion of the bitstream, the second portion is located after the first portion in the bitstream.

20 Claims, 24 Drawing Sheets

(51) Int. Cl.
*H04N 19/186* (2014.01)
*H04N 19/96* (2014.01)

(56) References Cited

U.S. PATENT DOCUMENTS

2021/0144391 A1* 5/2021 Poirier ................. H04N 19/176
2021/0266552 A1* 8/2021 Kotra ................... H04N 19/186

* cited by examiner

Table 1: Examples of chroma subsampling formats

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

FIG. 9

Table 2: Examples of multi-type tree splitting modes

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 18

NON-INTERLEAVED SEPARATE TREE

INCORPORATION BY REFERENCE

This present disclosure claims the benefit of priority to U.S. Provisional Application No. 63/224,767, "Non-Interleaved Separate Tree" filed on Jul. 22, 2021, and U.S. Provisional Application No. 63/224,771, "Non-Interleaved Separate Tree" filed on Jul. 22, 2021. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry determines that a non-interleaved separate tree structure is used for coding different color components of coding tree units (CTUs) in a bitstream. The processing circuitry decodes a first color component of a plurality of CTUs from a first portion of the bitstream, and decodes a second color component of the plurality of CTUs from a second portion of the bitstream, the second portion and the first portion are non-interleaved in the bitstream.

In some examples, the decoding of the first color component of the plurality of CTUs from the first portion of the bitstream is performed in parallel with the decoding of the second color component of the plurality of CTUs from the second portion of the bitstream. In some examples, the plurality of CTUs forms one of an intra picture, an inter picture, an intra block copy (IBC) picture, an intra slice in a picture, an inter slice in a picture, an IBC slice in a picture, an intra tile in a picture, an inter tile in a picture, or an IBC tile in a picture.

In some examples, the processing circuitry decodes luma coding tree blocks (CTBs) of the plurality of CTUs from a first portion of a network abstraction layer unit (NALU) in the bitstream, and decodes chroma CTBs of the plurality of CTUs from a second portion of the NALU. In an example, one or more bits are between the first portion and the second portion, and the second portion of the NALU starts from an integer byte after the first portion in the NALU. In some examples, the processing circuitry performs a context-adaptive binary arithmetic coding (CABAC) synchronization between the luma CTBs and chroma CTBs based on a value of a sequence parameter set (SPS) synchronization flag.

In some examples, the processing circuitry parses and decodes luma coding tree blocks (CTBs) of the plurality of CTUs from a first network abstraction layer unit (NALU) in the bitstream; and parses and decodes chroma CTBs of the plurality of CTUs from a second NALU in the bitstream. In an example, the parsing and decoding from the first NALU is performed in parallel with the parsing and decoding from the second NALU.

In some embodiments, the first color component of the plurality of CTUs corresponds to luma coding tree blocks (CTBs) of the plurality of CTUs, the second color component of the plurality of CTUs corresponds to chroma CTBs, and the processing circuitry decodes a chroma CTB of a different size in luma samples from a luma CTB.

In some embodiments, the processing circuitry predicts, chroma samples in a chroma block based on luma samples in at least a first luma coding tree block (CTB) and a second luma CTB in a cross-component linear model (CCLM) mode.

In some examples, the processing circuitry determines multiple luma blocks that are collocated with a chroma block; and derives a quantization parameter (QP) value for the chroma block based on at least one of: a QP value of a first collocated luma block that is decoded among the multiple luma blocks, an average QP value of the multiple luma blocks, a media QP value of the multiple luma blocks, or a QP value of a center luma block that is collocated with a center position of the chroma block.

In some examples, the processing circuitry decodes luma coding tree blocks (CTBs) of a CTB size in luma samples in a luma processing channel; and decodes chroma CTBs of the CTB size in luma samples in a chroma processing channel. In an example, the processing circuitry starts to decode a chroma CTB of a CTU after a decoding of a luma CTB of the CTU is finished.

In some examples, the processing circuitry determines a CTU level control parameter for a chroma coding tree block (CTB) based on at least one of signaling in the bitstream for the chroma CTB, and deriving the CTU level control parameter for the chroma CTB based on a collocated luma CTB.

In some examples, a luma coding tree block (CTB) is partitioned using a first splitting tree structure and a chroma CTB is partitioned using a second splitting tree structure that is different from the first splitting tree structure.

In an example, the processing circuitry determines a maximal luma tree size from the bitstream. In another example, the processing circuitry determines a minimal luma tree size from the bitstream. In another example, the processing circuitry determines a maximal chroma tree size from the bitstream. In another example, the processing circuitry determines a minimal chroma tree size from the bitstream.

In some examples, the processing circuitry derives a prediction mode of a chroma coding unit (CU) based on a collocated luma CU. In some examples, the processing circuitry determines a prediction mode of a chroma CU based on a signal in the bitstream in response to the chroma CU meets a minimal chroma block size requirement.

In some examples, the processing circuitry derives a motion vector of a chroma coding unit (CU) based on motion vectors of collocated luma CUs in response to the chroma CU being a chroma intra CU.

In some examples, the processing circuitry derives a block vector of a chroma coding unit (CU) based on block vectors of collocated luma CUs in response to the chroma CU being a chroma intra block copy (IBC) CU.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 9 shows examples of chroma subsampling formats according to embodiments of the disclosure.

FIG. 18 shows examples of MTT splitting modes according to embodiments of the disclosure.

DETAILED DESCRIPTION OF EMBODIMENTS

Figure 1A:
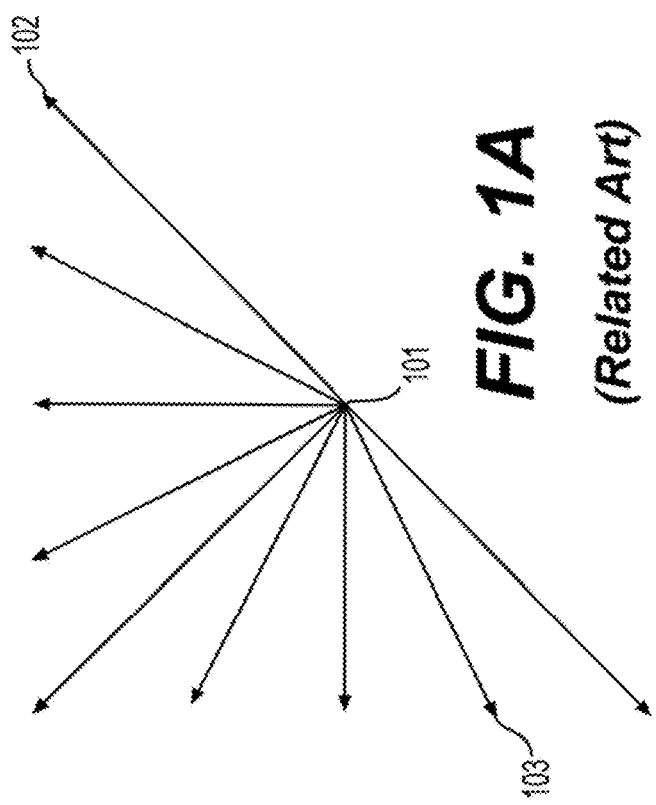
FIG. 1A is a schematic illustration of an exemplary subset of intra prediction modes.
Figure 1B:
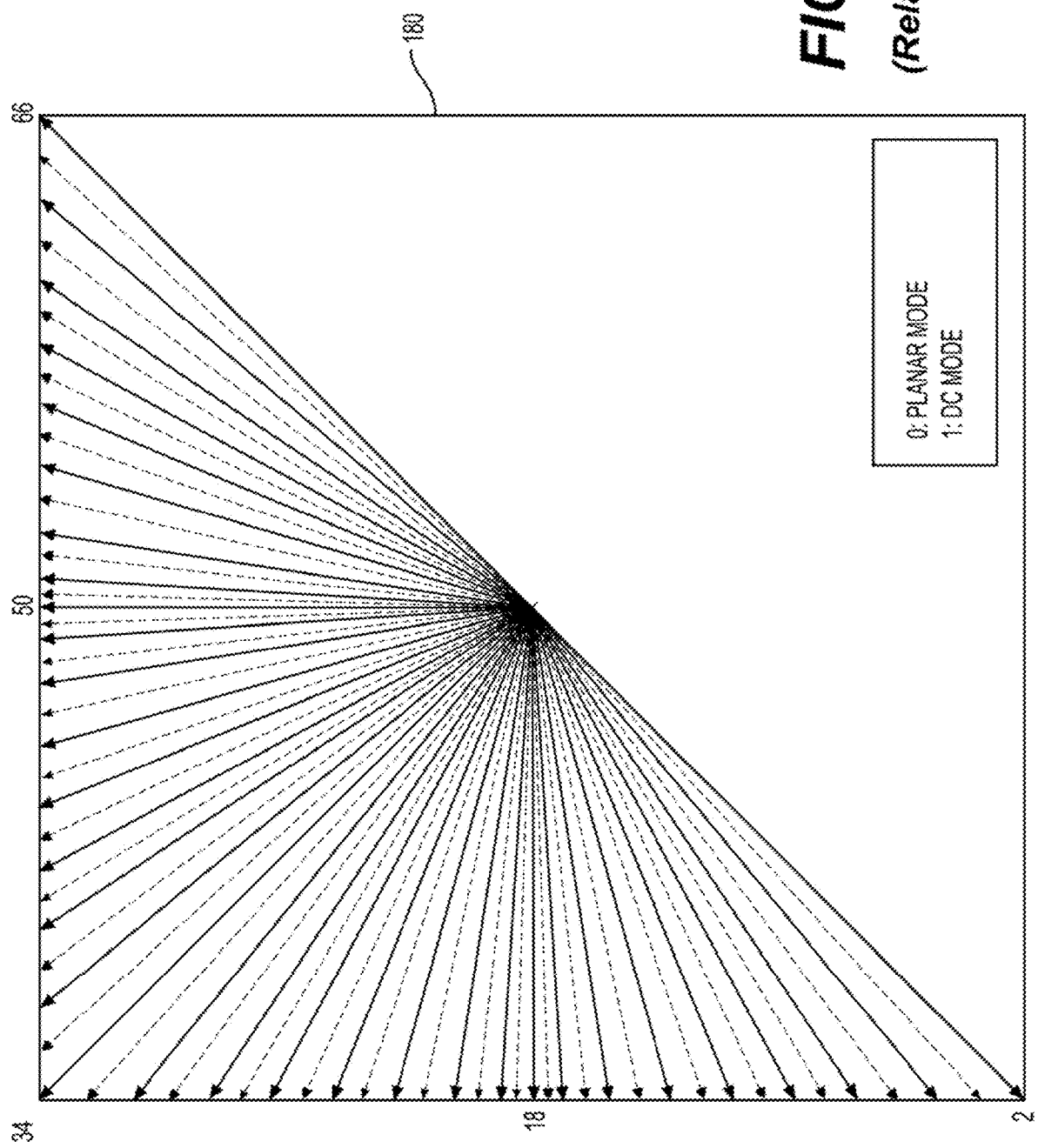
FIG. 1B is an illustration of exemplary intra prediction directions.
Figure 2:
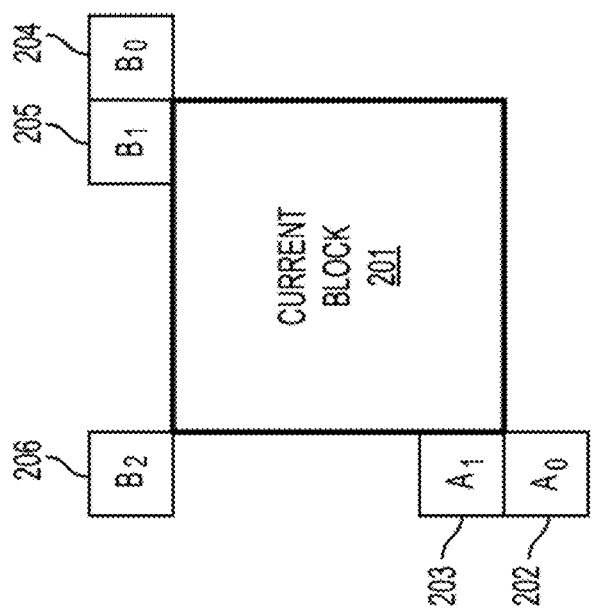
FIG. 2 is a schematic illustration of a current block and its surrounding spatial merge candidates in one example.
Figure 3:
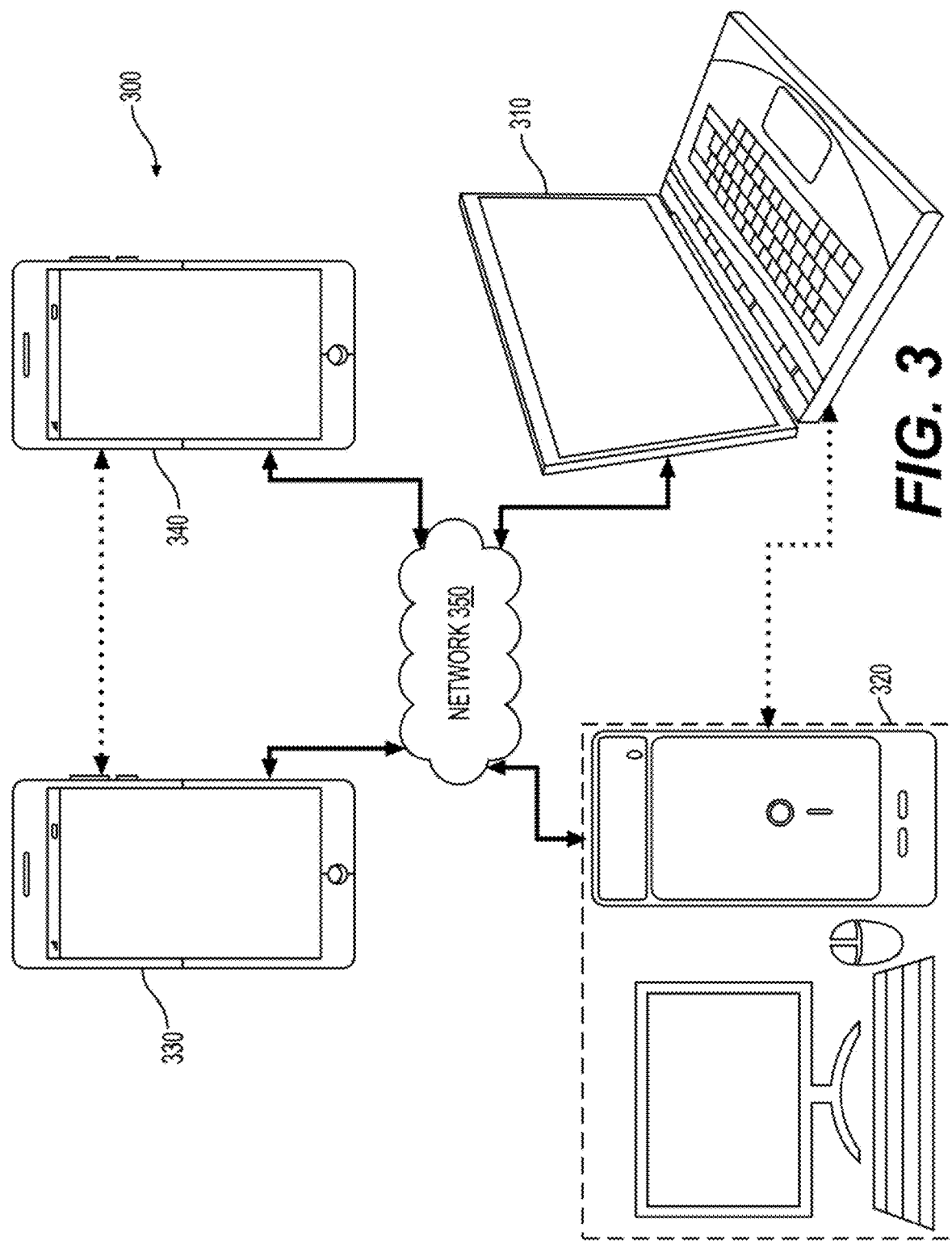
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
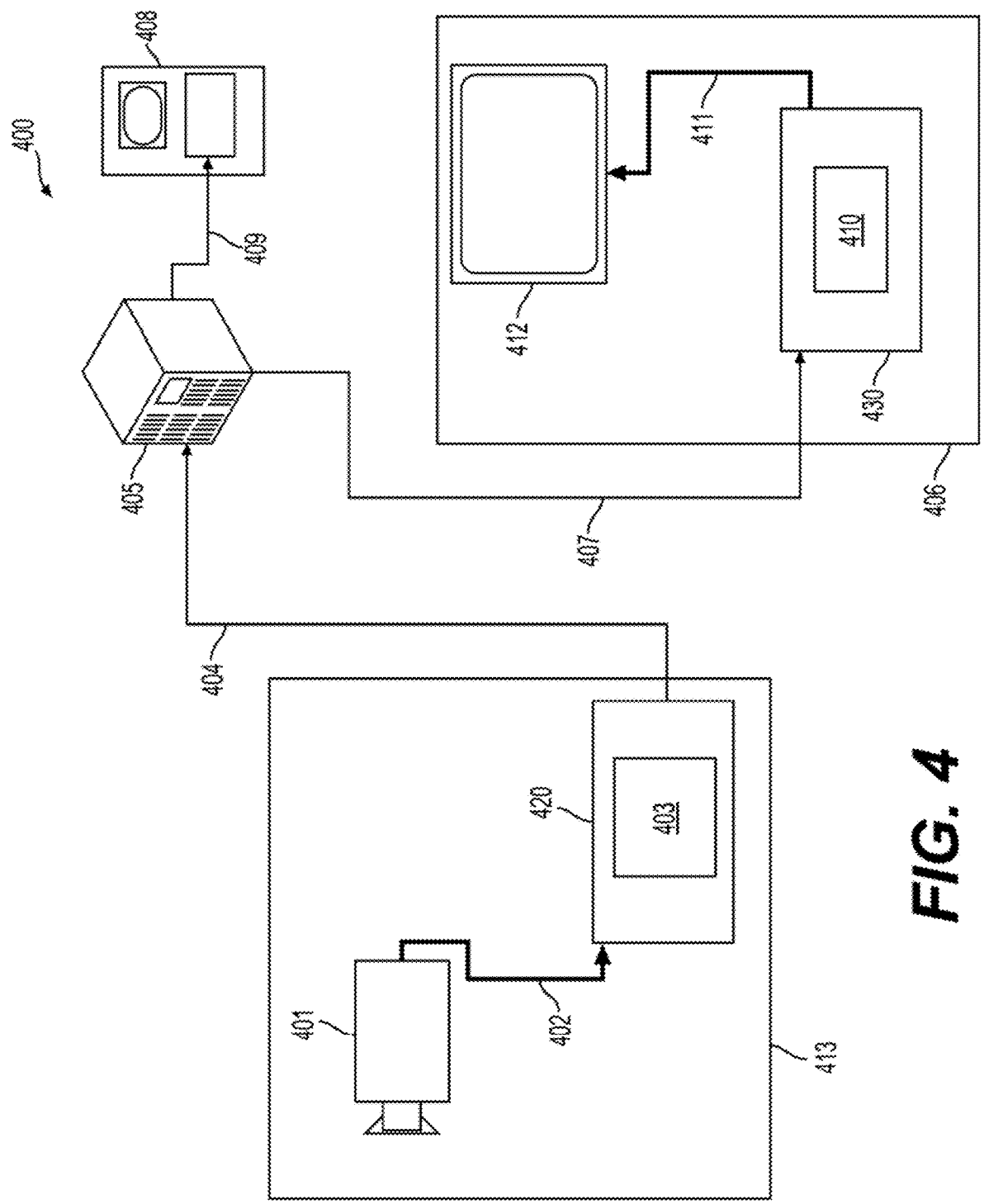
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
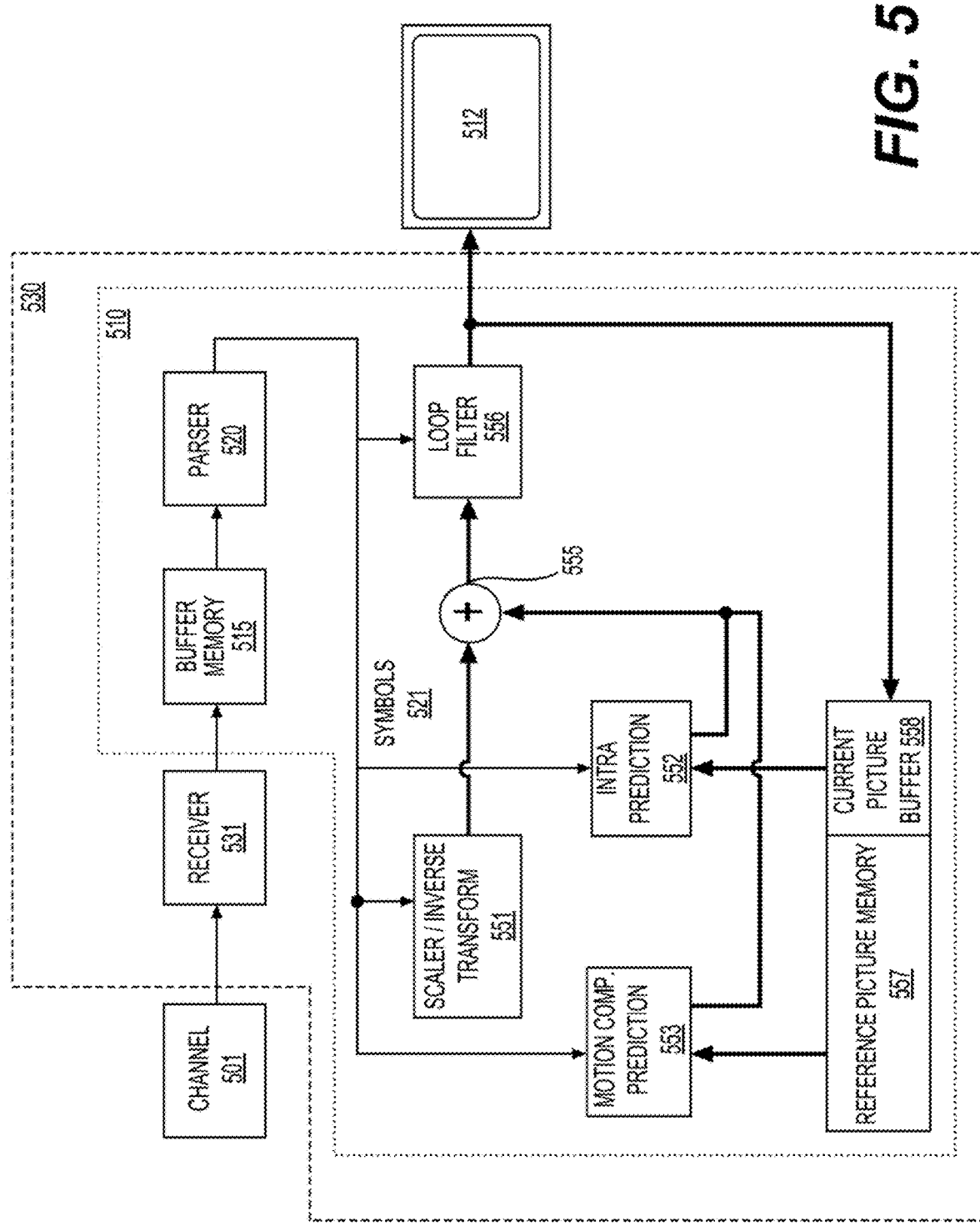
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
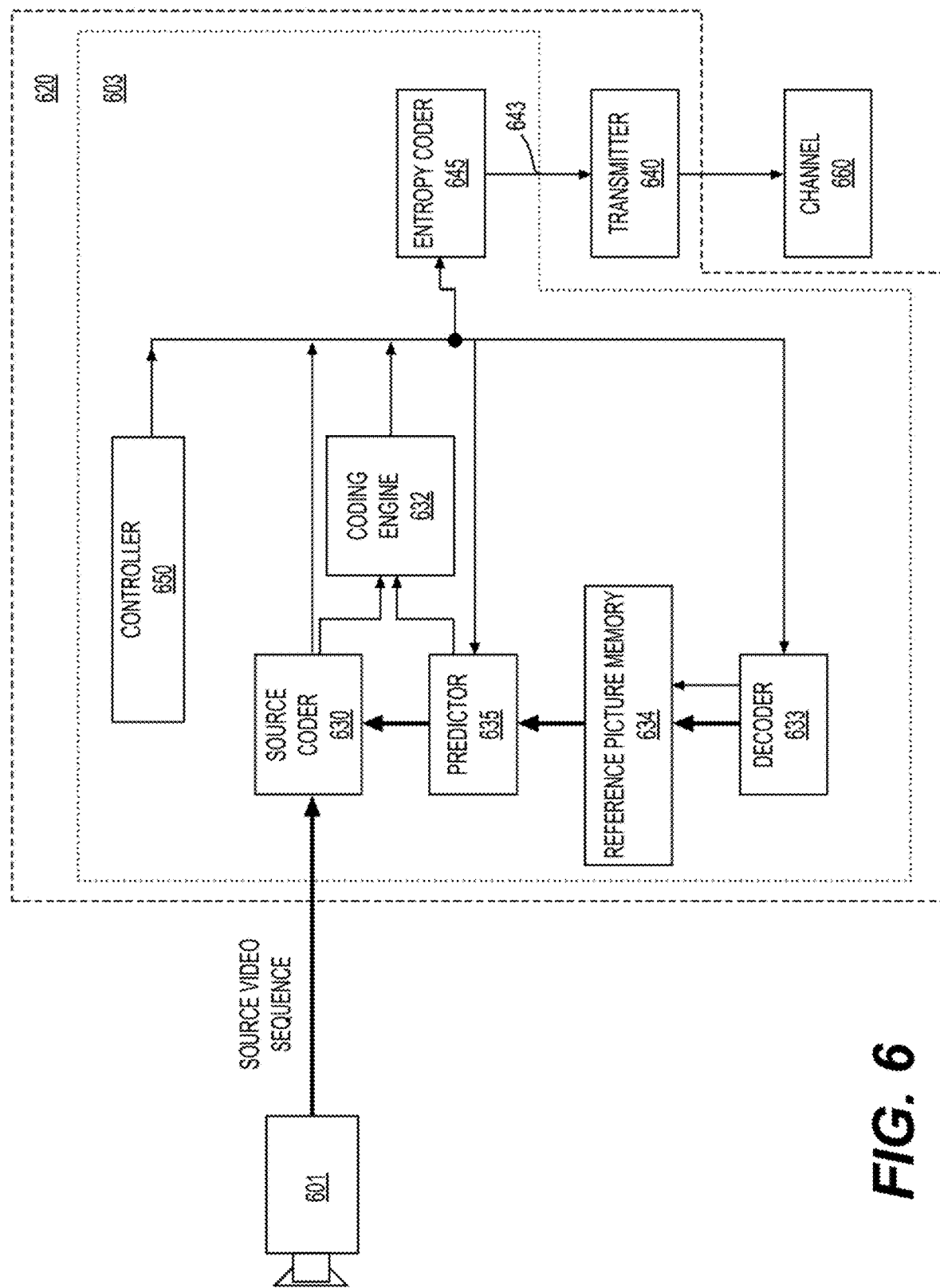
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
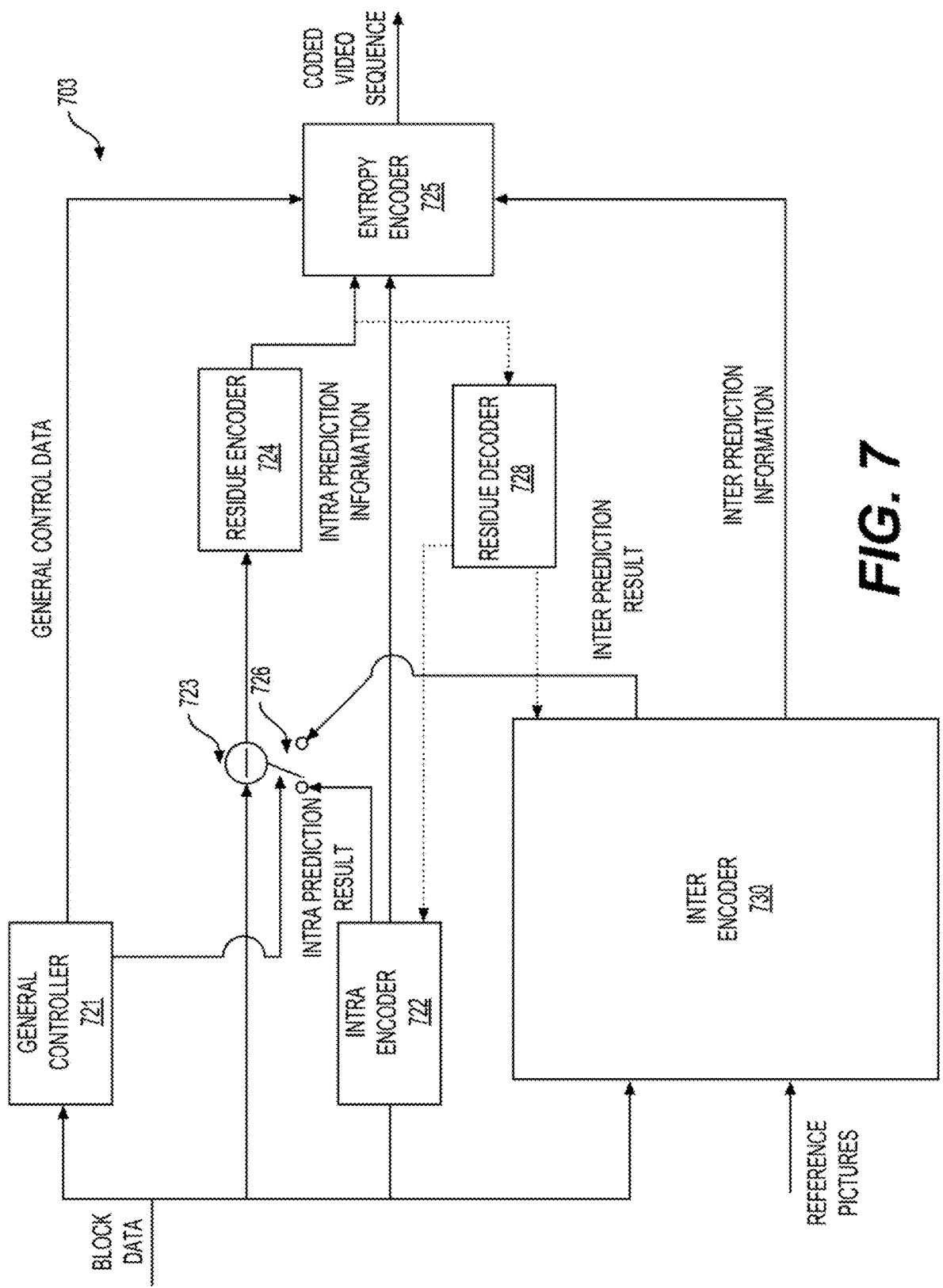
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
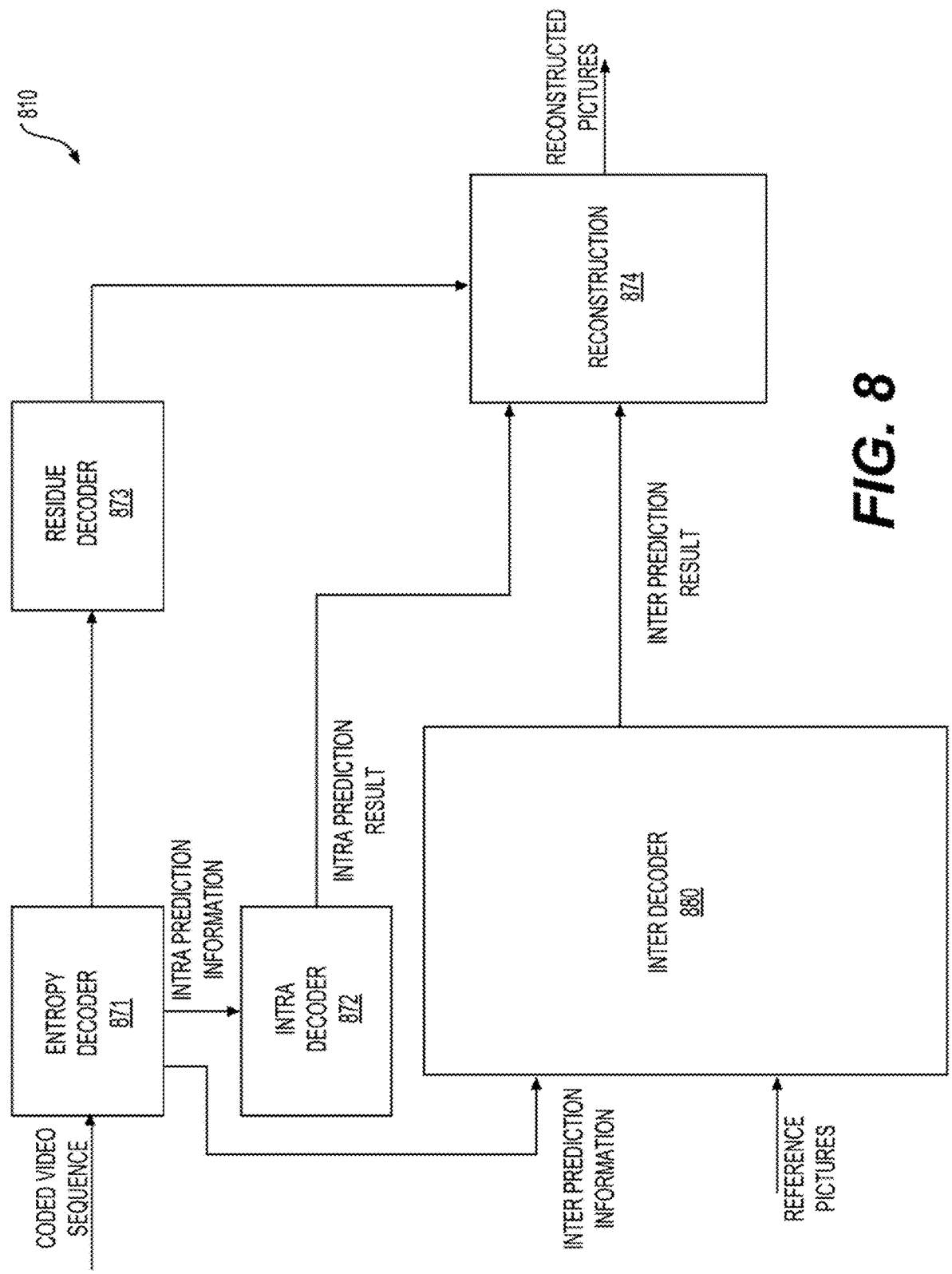
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantization Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

An exemplary relationship between source and decoded pictures that is given via a bitstream is described below. The video source represented by the bitstream can be a sequence of pictures in a decoding order. The source and the decoded pictures can each include one or more sample arrays, such as (1) Luma (Y) only (monochrome), (2) Luma and two chroma (e.g., YCbCr or YCgCo), (3) Green, blue, and red (GBR, also known as RGB), and (4) Arrays representing other unspecified monochrome or tri-stimulus color samplings (e.g., YZX, also known as XYZ). The sample arrays of a picture are also referred to as color components of the picture in some examples.

For convenience of notation and terminology in the disclosure, variables and terms associated with the above described arrays can be referred to as luma (or L or Y) and chroma, where the two chroma arrays can be referred to as Cb and Cr regardless of the actual color representation method in use. The actual color representation method in use can be further indicated by syntax.

In some embodiments, when multiple sample arrays are used, one of the sample arrays can be used as a reference sample space, and other sample arrays can be derived from the reference sample space based on sampling ratios. In an example, when luma and chroma array(s) (or blocks) are used, the luma sample array can be used as the reference sample space, and the chroma arrays can be derived from the reference sample space based on subsampling factors. In an example, luma and chroma arrays are included in the source and the decoded pictures, then subsampling factors, such as a chroma horizontal subsampling factor (e.g., SubWidthC) and a chroma vertical subsampling factor (e.g., SubHeightC) between the chroma block(s) and the corresponding luma block can be specified.

FIG. 9 shows a table (Table 1) to specify the variables SubWidthC and SubHeightC (also referred to as chroma subsampling ratios). In an example, an index and a flag, such as chroma_format_idc and separate_colour_plane_flag, can be used to specify chroma format, and then variables SubWidthC and SubHeightC can be determined based on the chroma format. In another example, an index, such as chroma_format_idc, can be used to specify chroma format, and then variables SubWidthC and SubHeightC can be determined based on the chroma format. It is noted that, in some examples, other suitable values of chroma_format_idc and corresponding SubWidthC and SubHeightC may also be specified.

Referring to FIG. 9, when the a chroma format index (e.g., chroma_format_idc) is 0, the chroma subsampling format can be 'Monochrome' corresponding to a monochrome sampling having only one sample array, which is nominally considered to be the luma array.

When the chroma format index is 1, the chroma subsampling format can be 4:2:0 or 4:2:0 sampling, each of the two chroma arrays has half the height and half the width of the corresponding luma array.

When the chroma format index is 2, the chroma subsampling format can be 4:2:2 or 4:2:2 sampling, each of the two chroma arrays has the same height and half the width of the luma array.

When the chroma format index is 3, the chroma subsampling format can be 4:4:4 or 4:4:4 sampling, depending on the value of a separate color plane flag (e.g., separate_colour_plane_flag), the following applies: (i) If the separate color plane flag is equal to 0, each of the two chroma arrays has the same height and width as the luma array; (ii) Otherwise, the separate color plane flag is equal to 1, the three color planes can be separately processed as monochrome sampled pictures.

A number of bits used for the representation of each of the samples in the luma and chroma arrays in a video sequence can be in a range of 8 bits to 16 bits, inclusive, and the number of bits used in the luma array may differ from the number of bits used in the chroma arrays.

Figures 10A, 10B:
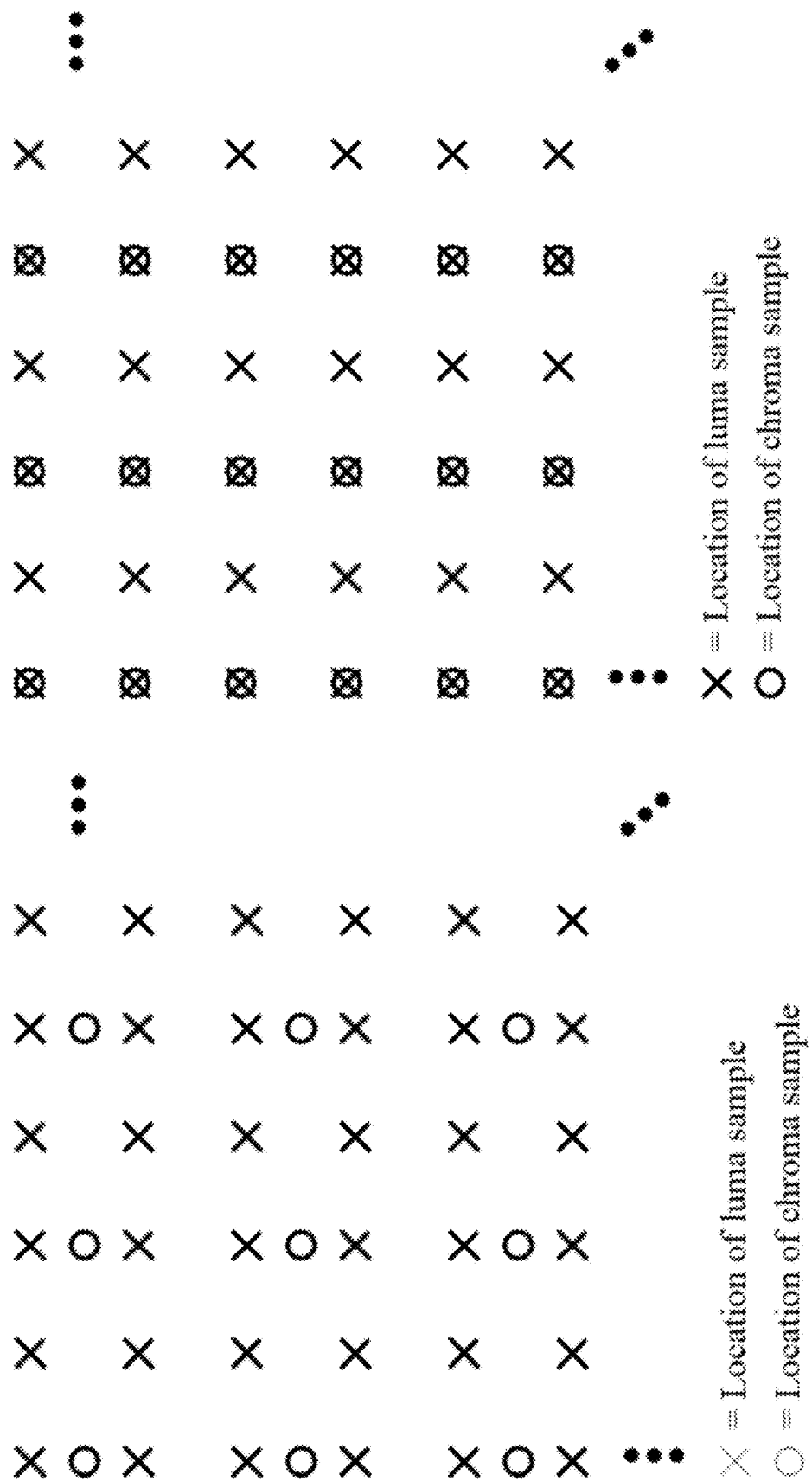
FIGS. 10A-10C show nominal vertical and horizontal relative locations of corresponding luma and chroma samples according to embodiments of the disclosure.
Figure 10C:
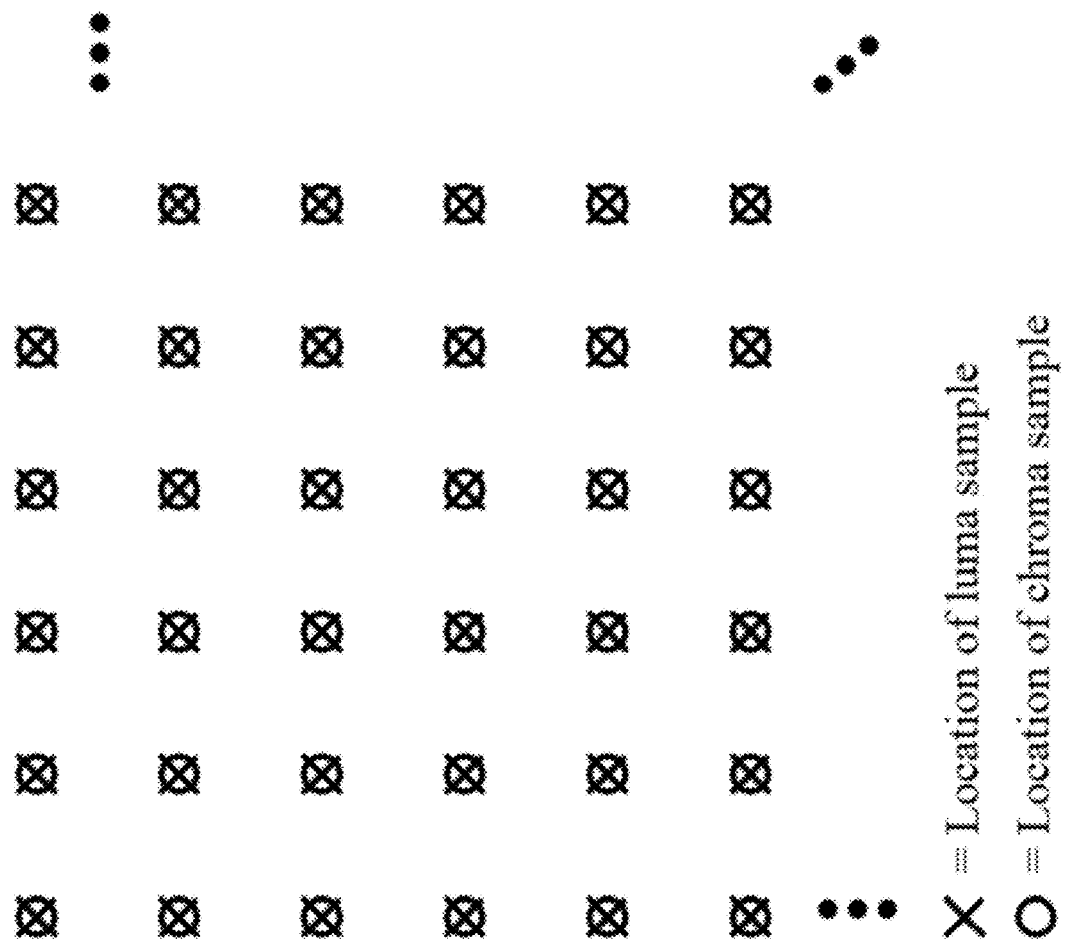

FIGS. 10A-10C show nominal vertical and horizontal relative locations of corresponding luma and chroma samples in respective pictures according to embodiments of the disclosure. Alternative chroma sample relative locations may be indicated in video usability information.

Referring to FIG. 10A, in an example, the value of a chroma format index (e.g., chroma_format_idc) is equal to 1, thus the chroma format is 4:2:0. FIG. 10A shows an example of the nominal vertical and horizontal locations of the corresponding luma and chroma samples in a picture. In some examples, chroma samples are located vertically between two neighboring luma sample locations and are located horizontally at luma sample locations.

Referring to FIG. 10B, the value of the chroma format index is equal to 2, thus the chroma format is 4:2:2. In some examples, the chroma samples are co-sited (or co-located) with the corresponding luma samples in a picture. FIG. 10B shows an example of the nominal vertical and horizontal locations of the corresponding luma and chroma samples in a picture.

Referring to FIG. 10C, when the value of the chroma format index is equal to 3, all array samples (e.g., the luma array samples and the two chroma array samples) can be co-sited (or co-located). FIG. 10C shows an example of the nominal vertical and horizontal locations of the corresponding luma and chroma samples in a picture.

Figure 11:
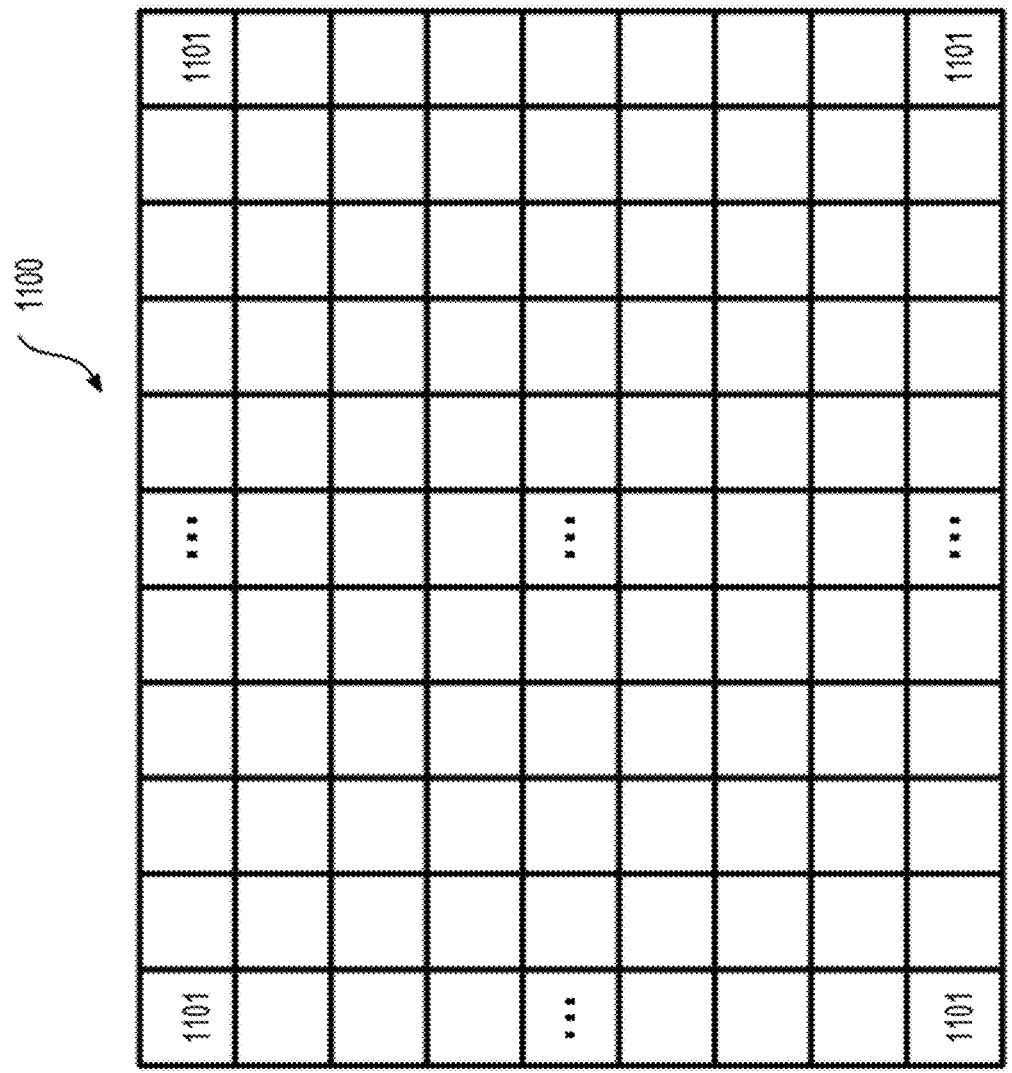
FIG. 11 shows an example of a picture (1100) divided into CTUs (1101) according to an embodiment of the disclosure.

An example of partitioning, such as in VVC, is described below. In an embodiment, a picture can be partitioned into CTUs. Pictures can be divided into a sequence of CTUs. For a picture that has three sample arrays, a CTU can include an N×N block (e.g., a luma block) of luma samples together with two corresponding blocks (e.g., two chroma blocks) of chroma samples. FIG. 11 shows an example of a picture (1100) divided into CTUs (1101) according to an embodiment of the disclosure. In an example, the maximum allowed size of a luma block in a CTU is specified to be 128×128. In an example, the maximum size of luma transform blocks is 64×64.

Pictures can be partitioned into slices, tiles, and/or bricks. A picture can be divided into one or more tile rows and one or more tile columns. A tile can be a sequence of CTUs that covers a rectangular region of a picture. A tile can be divided into one or more bricks, each of which can include a number of CTU rows within the tile. A tile that is not partitioned into multiple bricks can also be referred to as a brick. However, a brick that is a true subset of a tile is not referred to as a tile.

A slice can include a number of tiles in a picture or a number of bricks in a tile. Two modes of slices, e.g., a raster-scan slice mode and a rectangular slice mode, can be supported. In the raster-scan slice mode, a slice can include a sequence of tiles in a tile raster scan of a picture. In the rectangular slice mode, a slice can include a number of bricks of a picture that can collectively form a rectangular region of the picture. The bricks within a rectangular slice are in an order of a brick raster scan of the slice.

Figure 12:
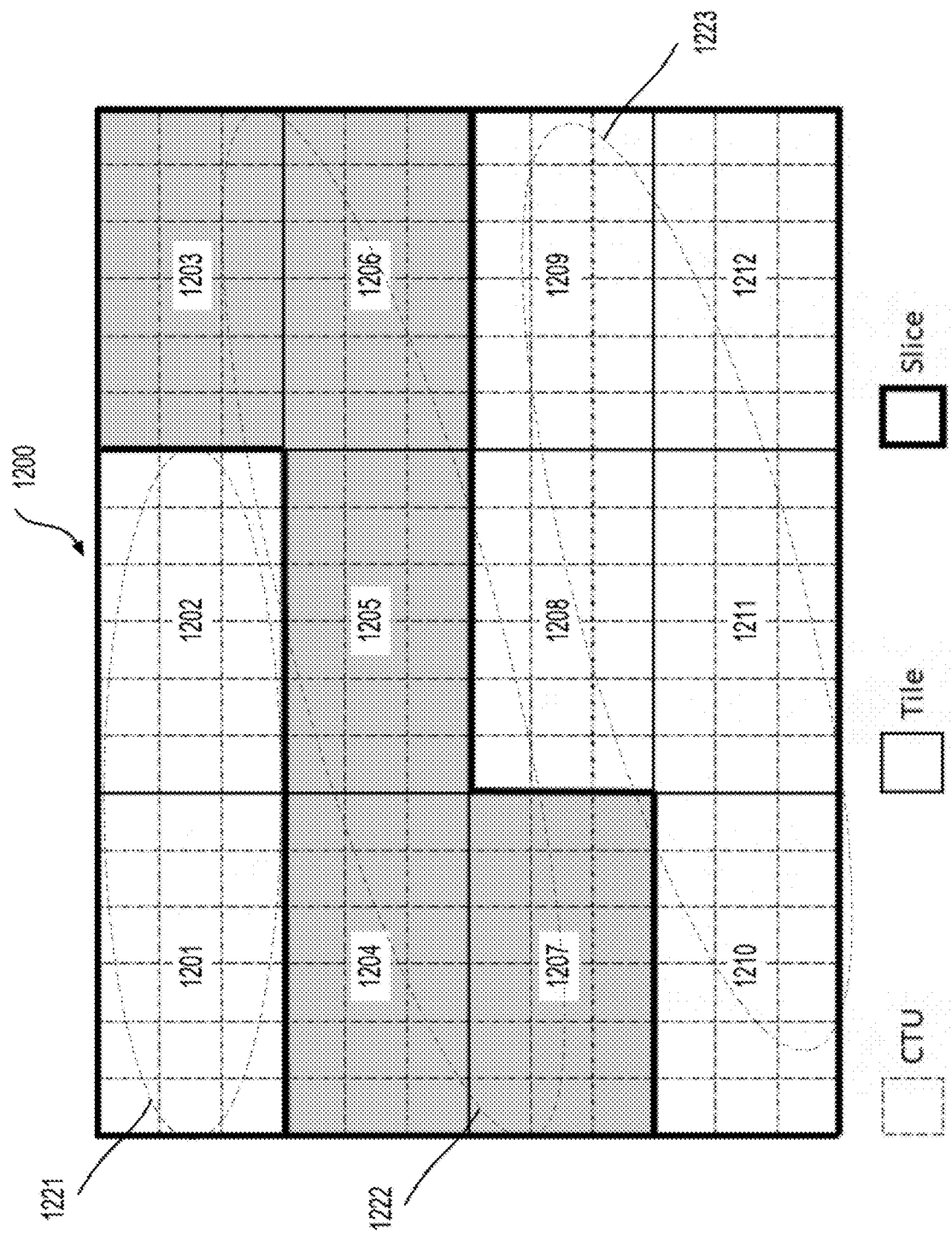
FIG. 12 shows an example of a raster-scan slice partitioning of a picture (1200) according to an embodiment of the disclosure.

A picture can be partitioned into tiles and raster-scan slices. FIG. 12 shows an example of a raster-scan slice partitioning of a picture (1200) according to an embodiment of the disclosure. The picture (1200) can be divided into 12 tiles (1201)-(1212) (e.g., 12 tiles in 3 columns (or tile columns) and 4 rows (or tile rows)) and 3 raster-scan slices (1221)-(1223). For example, the raster-scan slice (1221) includes the tiles (1201)-(1202), the raster-scan slice (1222) includes the tiles (1203)-(1207), and the raster-scan slice (1223) includes the tiles (1208)-(1212).

Figure 13:
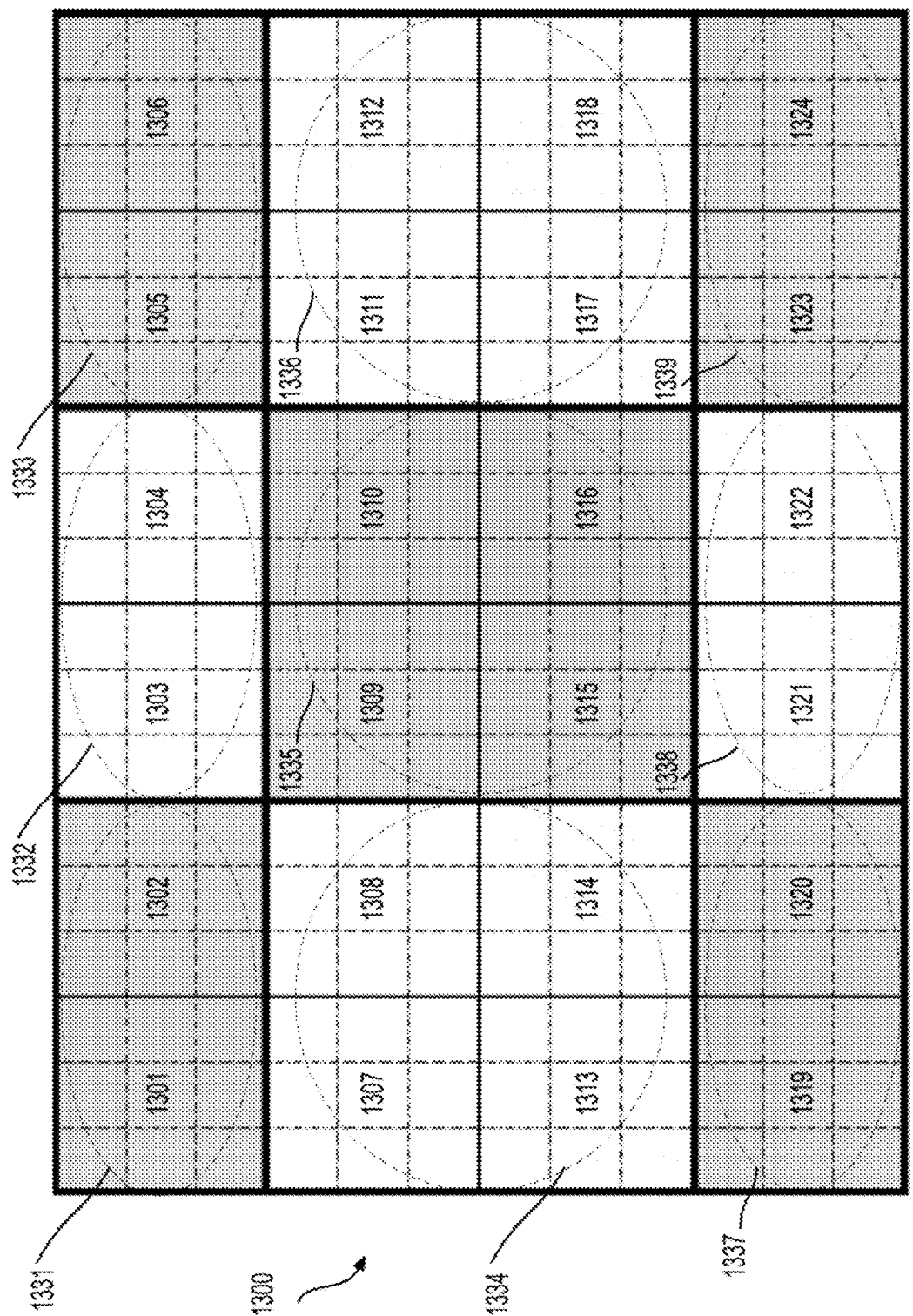
FIG. 13 shows an example of a rectangular slice partitioning of a picture (1300) according to an embodiment of the disclosure.

A picture can be partitioned into tiles and rectangular slices. FIG. 13 shows an example of a rectangular slice partitioning of a picture (1300) according to an embodiment of the disclosure. The picture (1300) can be divided into 24 tiles (1301)-(1324) (e.g., 24 tiles in 6 columns (or tile columns) and 4 rows (or tile rows)) and 9 rectangular slices (1331)-(1339). For example, the rectangular slice (1331) includes the tiles (1301)-(1302); the rectangular slice (1332) includes the tiles (1303)-(1304); the rectangular slice (1333) includes the tiles (1305)-(1306); the rectangular slice (1334) includes the tiles (1307), (1308), (1313), and (1314); the rectangular slice (1335) includes the tiles (1309), (1310), (1315), and (1316); the rectangular slice (1336) includes the tiles (1311), (1312), (1317), and (1318); the rectangular slice (1337) includes the tiles (1319)-(1320); the rectangular slice (1338) includes the tiles (1321)-(1322); and the rectangular slice (1339) includes the tiles (1323)-(1324).

Figure 14:
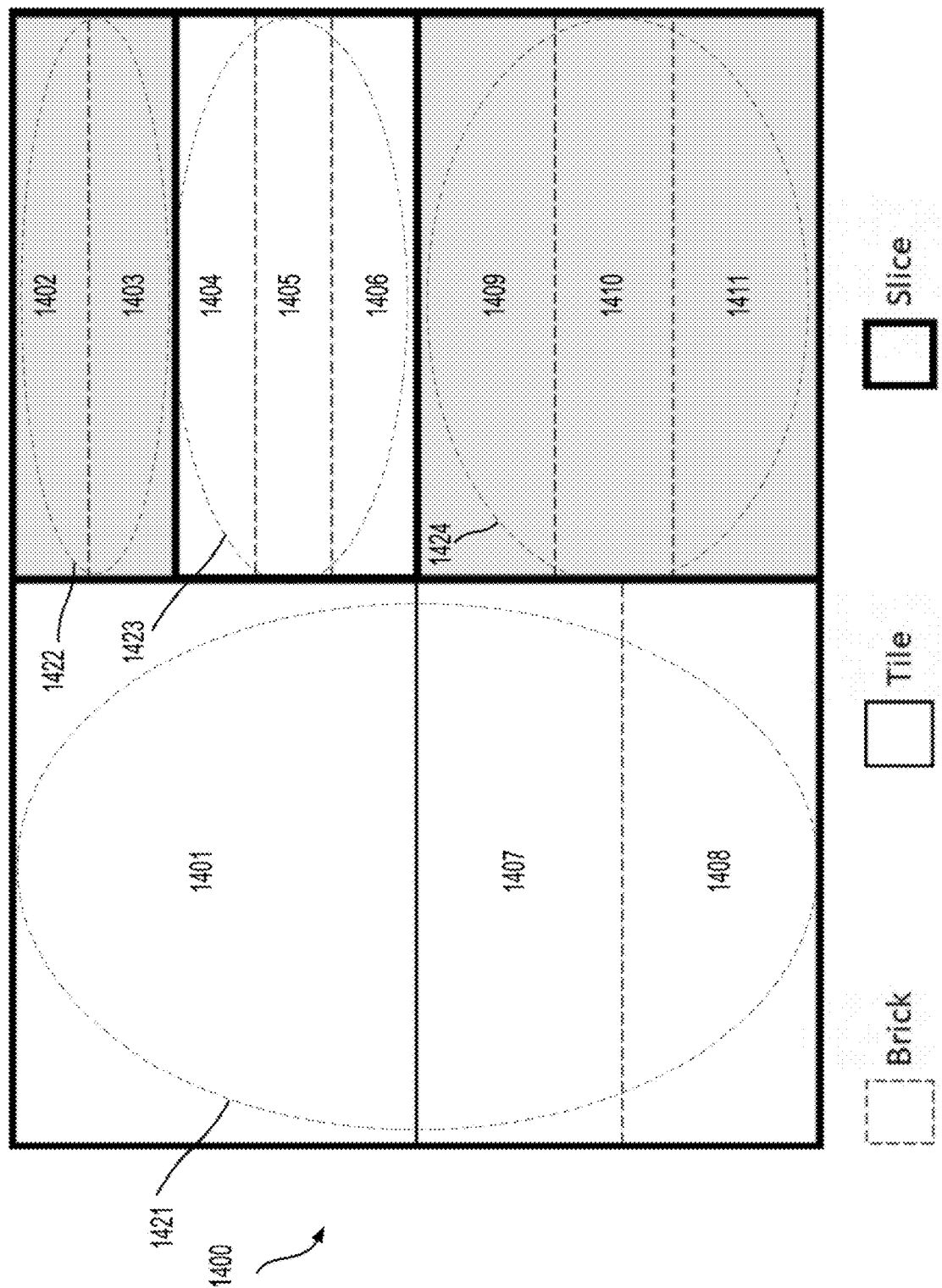
FIG. 14 shows an example of a picture (1400) partitioned into tiles, bricks (1401)-(1411), and rectangular slices (1421)-(1424) according to an embodiment of the disclosure.

A picture can be partitioned into tiles, bricks, and rectangular slices. FIG. 14 shows an example of a picture (1400) partitioned into tiles, bricks (1401)-(1411), and rectangular slices (1421)-(1424) according to an embodiment of the disclosure. The picture (1400) can be divided into the four tiles (e.g., two tile columns and two tile rows), the eleven bricks (1401)-(1411), and the four rectangular slices (1421)-(1424). The top-left tile includes one brick (1401), the top-right tile includes five bricks (1402)-(1406), the bottom-left tile includes two bricks (1407)-(1408), and the bottom-right tile includes three bricks (1409)-(1411). The rectangular slice (1421) includes the bricks (1401), (1407), and (1408); the rectangular slice (1422) includes the bricks (1402) and (1403); the rectangular slice (1423) includes the bricks (1404)-(1406); and the rectangular slice (1424) includes the bricks (1409)-(1411).

Figure 15:
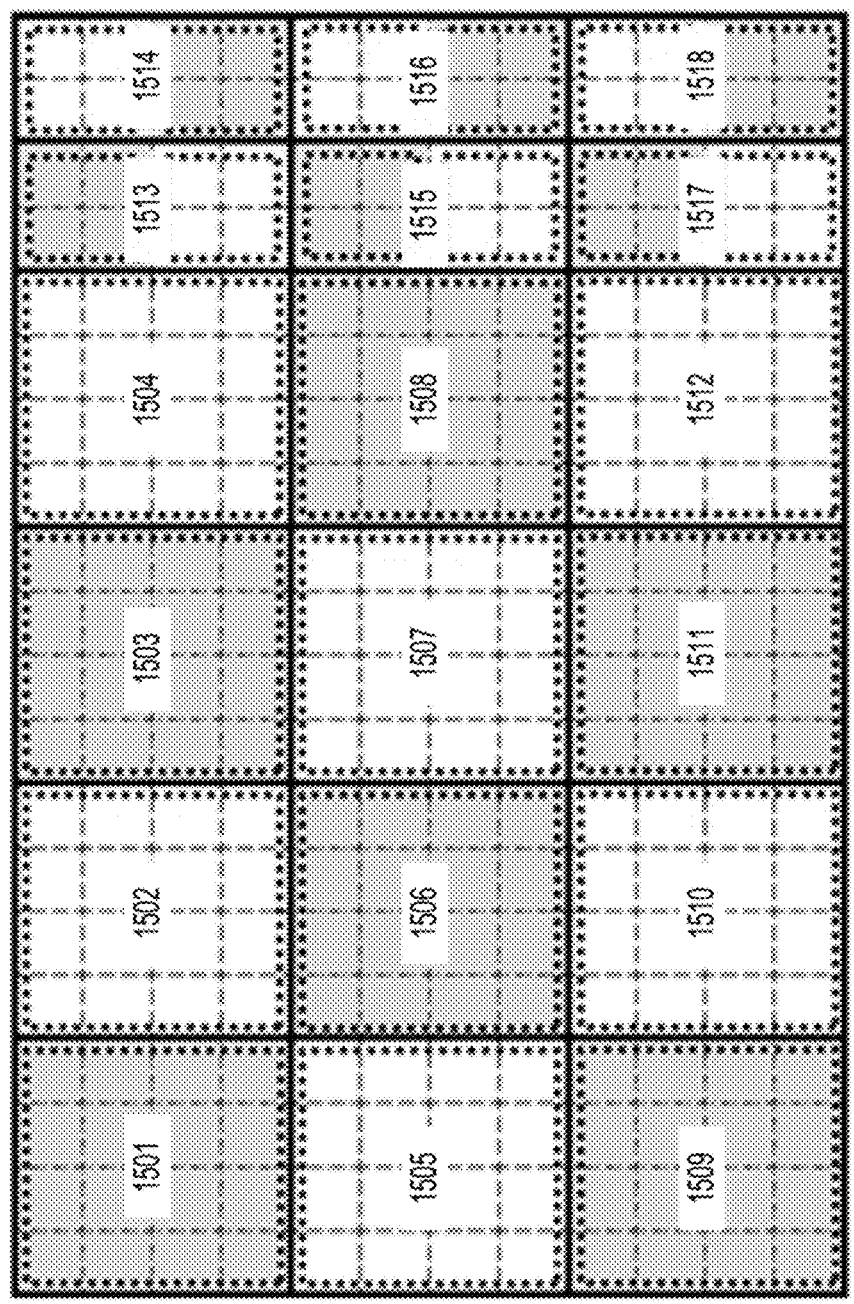
FIG. 15 shows an example of partitioning of a picture in some examples.

FIG. 15 shows an example of a picture (1500) that is partitioned into tiles. In the FIG. 15 example, the picture (1500) is partitioned into 18 tiles (1501)-(1518). Each of the 12 tiles (1501)-(1512) on the left-hand side covers a slice of 4 by 4 CTUs and each of the 6 tiles (1513)-(1518) on the right-hand side covers 2 vertically-stacked slices of 2 by 2 CTUs, Altogether, the picture (1500) is partitioned into 24 slices, and each slice is a subpicture. The 24 subpictures are of varying dimensions.

A CTU can be partitioned using a tree structure. In an embodiment, such as in HEVC, a CTU can be split into CU(s) by using a quaternary-tree or a QT structure denoted as a coding tree to adapt to various local characteristics. A decision whether to code a picture area using inter-picture (or temporal) or intra-picture (or spatial) prediction can be made at a leaf CU level. Each leaf CU can be further split into one, two or four PUs according to the PU splitting type. Inside a PU, the same prediction process can be applied and the relevant information can be transmitted to a decoder on a PU basis. After obtaining a residual block by applying the prediction process based on the PU splitting type, a leaf CU can be partitioned into transform units (TUs) according to a QT structure similar to the coding tree for the CU. In an example, such as in the HEVC structure, multiple partition units, such as CU, PU, and TU can be different.

In an embodiment, such as in VVC, a quadtree with nested multi-type tree using binary and ternary splits segmentation structure can replace the concepts of multiple partition unit types, and thus can remove the separation of the CU, PU and TU concepts and can support more flexibility for CU partition shapes. In some examples, when a CU has a size too large for a maximum transform length, different sizes may be used for CU, PU, and/or TU. In the coding tree structure, a CU can have either a square or rectangular shape. A CTU can be first partitioned by a QT structure. Then the QT leaf nodes can be further partitioned by a multi-type tree (MTT) structure.

Figure 16:
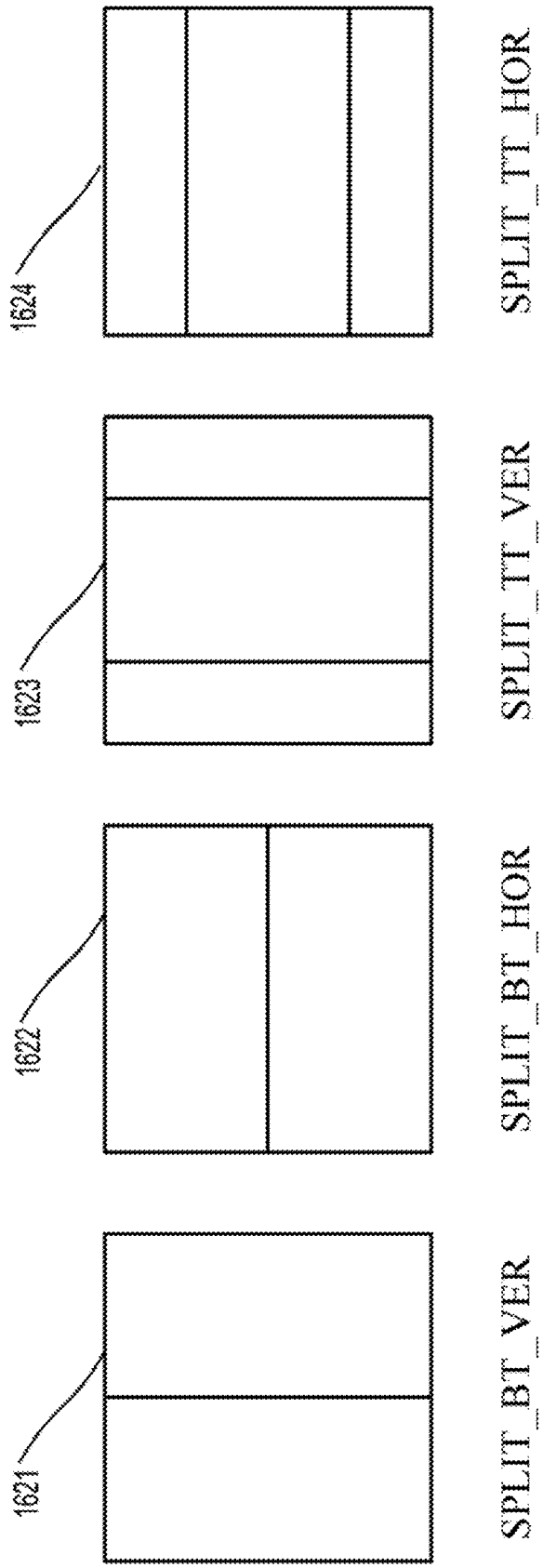
FIG. 16 shows exemplary splitting types (1621)-(1624) in a multi-type tree (MTT) structure according to embodiments of the disclosure.

FIG. 16 show exemplary splitting types (1621)-(1624) in a MTT structure according to embodiments of the disclosure. The splitting types (1621)-(1624) can include a vertical binary splitting (SPLIT_BT_VER) (1621), a horizontal binary splitting (SPLIT_BT_HOR) (1622), a vertical ternary splitting (SPLIT_TT_VER) (1623), and a horizontal ternary splitting (SPLIT_TT_HOR) (1624). The MTT leaf nodes can be referred to CUs, and unless the CU is too large for the maximum transform length, the segmentation (or the CU) can be used for prediction and transform processing without any further partitioning. Thus, in most cases, the CU, PU and TU can have the same block size in the QT with a nested MTT coding block structure. One exception occurs when the maximum supported transform length is smaller than the width or height of the color component of the CU.

Figure 17:
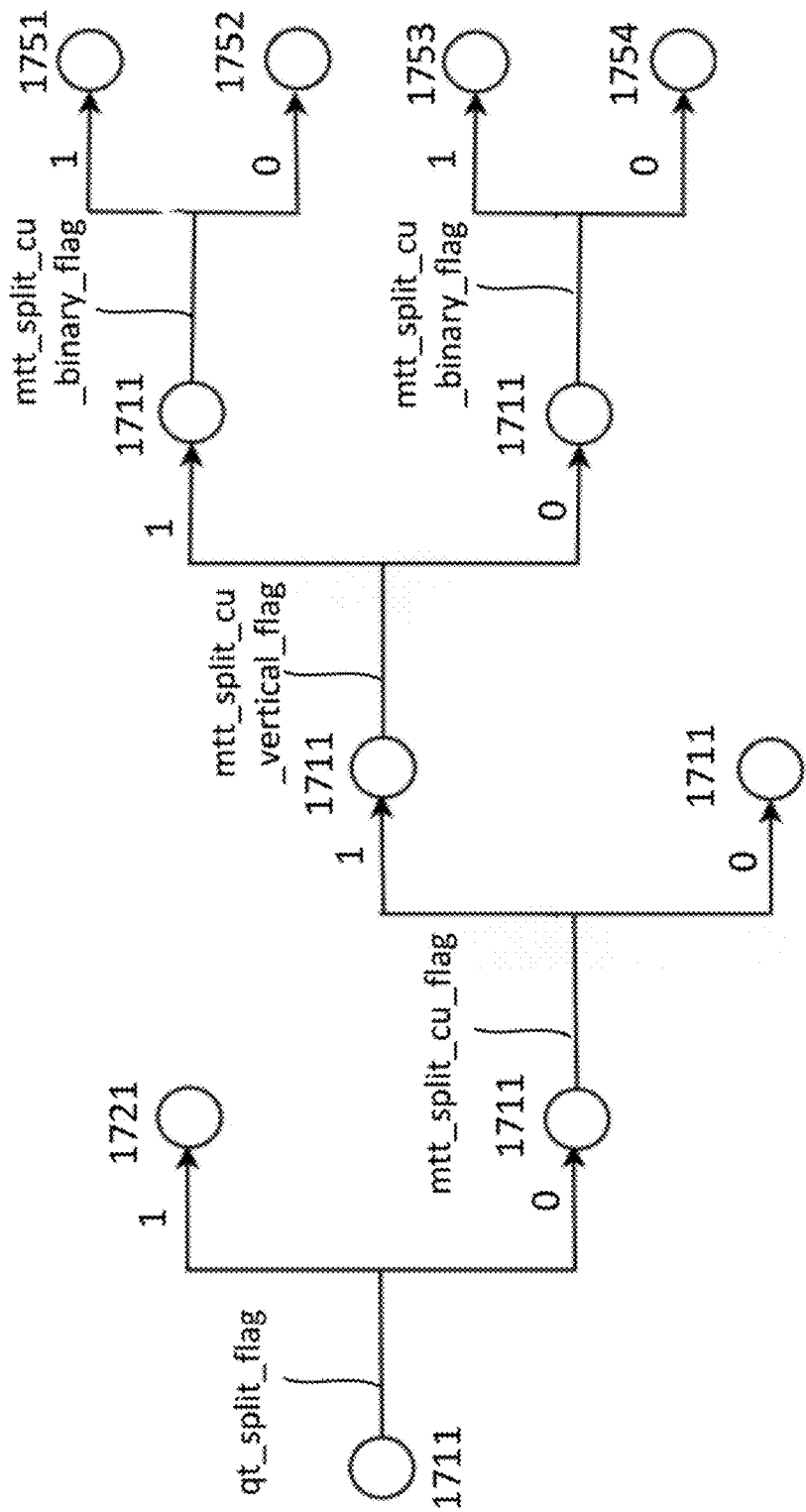
FIG. 17 shows examples of splitting flags signaling in a quaternary tree (QT) with nested MTT coding tree structure according to an embodiment of the disclosure.

FIG. 17 shows examples of splitting flags signaling for a QT with a nested MTT coding tree structure according to an embodiment of the disclosure. FIG. 17 illustrates an exemplary signaling mechanism of partition splitting information in the QT with the nested MTT coding tree structure. A node (1711), such as a CTU, can be treated as a root of a QT and can be first partitioned by a QT structure into QT nodes when a QT splitting flag (e.g., qt_split_flag) is true (e.g., a value '1') to generate QT nodes (1721). When the QT splitting flag (e.g., qt_split_flag) is false (e.g., a value '0'), the node (1711) is not split using the QT splitting, and thus can be referred to as a QT leaf node (1711). Each QT leaf node (when sufficiently large to allow it) can be further partitioned by a MTT structure, and can be referred to as a MTT node. Referring to FIG. 17, the QT leaf node or the MTT node (1711) can be further partitioned using MTT splitting.

In the MTT structure, a first flag (e.g., a mtt_split_cu_flag) can be signaled to indicate whether the node (1711) is further partitioned. When the node (1711) is not partitioned (e.g., mtt_split_cu_flag being '0'), the node (1711) is referred to as a MTT leaf node (1711). When the node (1711) is further partitioned (e.g., mtt_split_cu_flag being '1'), a second flag (e.g., a mtt_split_cu_vertical_flag) can be signaled to indicate a splitting direction (a horizontal split or a vertical split), and then a third flag (e.g., a mtt_split_cu_binary_flag) can be signaled to indicate whether the split is a binary split or a ternary split. Accordingly, MTT nodes (1751) is generated based on a vertical binary split (e.g., BT_VER_split) of the node (1711), MTT nodes (1752) is generated based on a vertical ternary split (e.g., TT_VER_split) of the node (1711), MTT nodes (1753) is generated based on a horizontal binary split (e.g., BT_HOR_split) of the node (1711), and MTT nodes (1754) is generated based on a horizontal ternary split (e.g., TT_HOR_split) of the node (1711).

Referring to FIG. 18, based on the values of the second flag (e.g., the mtt_split_cu_vertical_flag) and the third flag (e.g., mtt_split_cu_binary_flag), the MTT splitting mode (e.g., a MttSplitMode) of a CU can be derived as shown in Table 2. The MTT splitting modes can include the vertical binary split (e.g., BT_VER_split or SPLIT_BT_VER), the vertical ternary split (e.g., TT_VER_split or SPLIT_TT_VER), the horizontal binary split (e.g., BT_HOR_split or SPLIT_BT_HOR), and the horizontal ternary split (e.g., TT_HOR_split or SPLIT_TT_HOR).

Figure 19:
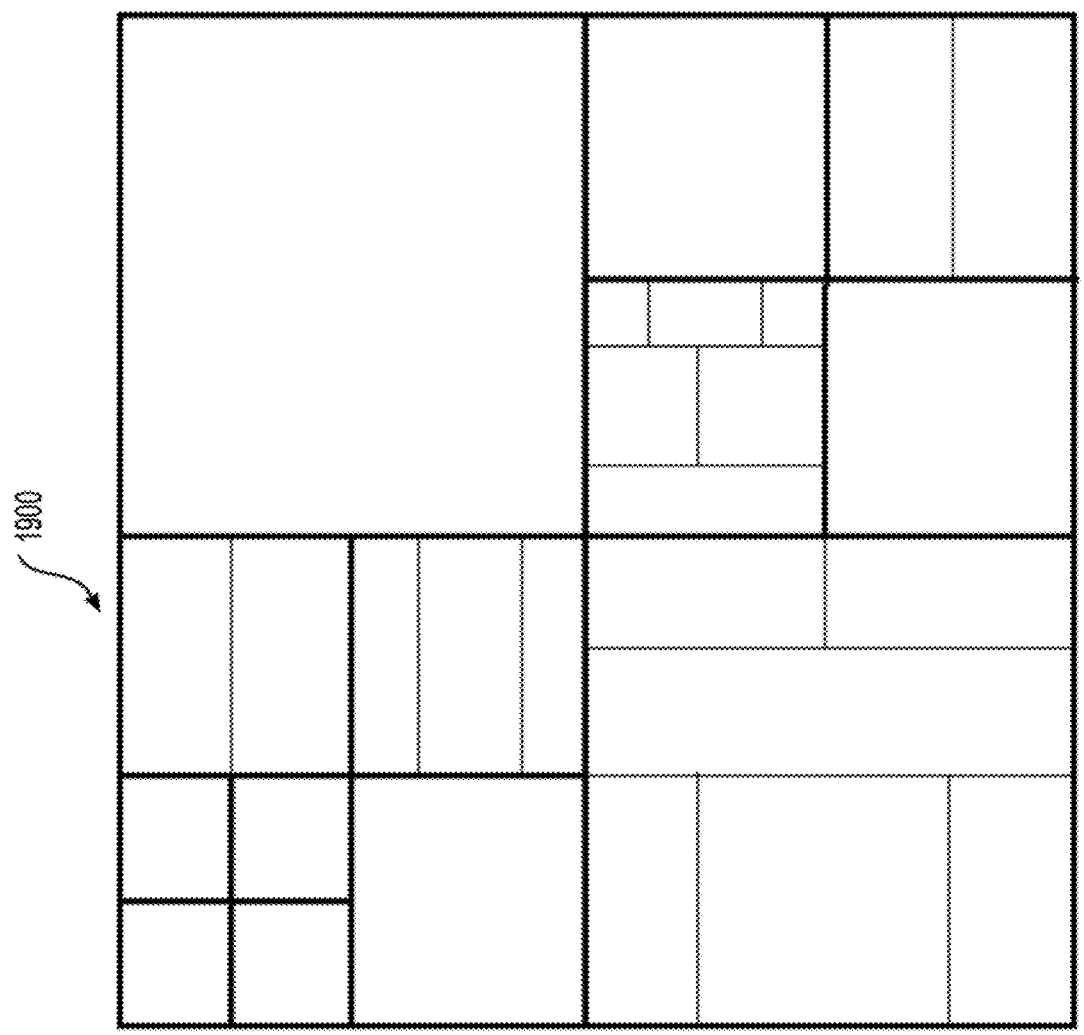
FIG. 19 shows an example of QT with a nested MTT coding block structure according to an embodiment of the disclosure.

FIG. 19 shows example of QT with a nested MTT coding block structure according to an embodiment of the disclosure. A CTU (1900) can be divided into multiple CUs with a QT and a nested MTT coding block structure, where bold block edges represent QT partitioning and remaining edges represent MTT partitioning. The QT with the nested MTT partition can provide a content-adaptive coding tree structure including CUs. A size of a CU can be any suitable size. A size of a CU may be as large as the CTU (1900) or as small as 4×4 in units of luma samples. In an example, for the 4:2:0 chroma format, the maximum chroma CB size can be 64×64 and the minimum chroma CB size can be 2×2.

In an example, such as VVC, the maximum supported luma transform size is 64×64 and the maximum supported chroma transform size is 32×32. When a width or a height of a CB is larger the maximum transform width or height, the CB can be automatically split in the horizontal and/or vertical direction to meet the transform size restriction in the respective direction.

The following parameters can be defined and specified by sequence parameter set (SPS) syntax elements for the QT with the nested MTT coding tree scheme. The following parameters can include (1) a CTU size that is a root node size of a QT tree, (2) a MinQTSize that is a minimum allowed QT leaf node size, (3) a MaxBtSize that is a maximum allowed BT root node size, (4) a MaxTtSize that is a maximum allowed TT root node size, (5) a MaxMttDepth that is a maximum allowed hierarchy depth of MTT splitting from a QT leaf, (6) a MinBtSize that is a minimum allowed BT leaf node size, (7) a MinTtSize that is a minimum allowed TT leaf node size, and/or the like.

In an example of the QT with the nested MTT coding tree structure, the CTU size is set as 128×128 luma samples with two corresponding 64×64 blocks of 4:2:0 chroma samples, the MinQTSize is set as 16×16, the MaxBtSize is set as 128×128, the MaxTtSize is set as 64×64, the MinBtSize and MinTtSize (for both width and height) is set as 4×4, and the MaxMttDepth is set as 4. The QT partitioning can be applied to the CTU first to generate QT leaf nodes. The QT leaf nodes can have a size from 16×16 (e.g., the MinQTSize) to 128×128 (e.g., the CTU size). In an example, if the QT leaf node is 128×128, the QT leaf node is not further split by the BT since the size exceeds the MaxBtSize and the MaxTtSize (e.g., 64×64). Otherwise, the QT leaf node can be further partitioned by the MTT. Therefore, the QT leaf node can also be a root node for the MTT and can have a MTT depth (e.g., a MttDepth) of 0. When the MTT depth reaches the MaxMttDepth (e.g., 4), no further splitting is considered. When the MTT node has a width equal to the MinBtSize and smaller or equal to 2×MinTtSize, no further horizontal splitting is considered. Similarly, when the MTT node has a height equal to the MinBtSize and smaller or equal to 2×MinTtSize, no further vertical splitting is considered in an example.

In some examples (e.g., VVC), the coding tree scheme (referred to as separate tree structure scheme) supports the ability for a luma component (e.g., luma CTB) and corresponding chroma component(s) (chroma CTBs) to have separate block tree structures (also referred to as coding tree structure, tree structure, coding tree or tree). In an example, for P and B slices, luma and chroma CTBs in a CTU share a same coding tree structure (e.g., a single coding tree). For I slices, luma and chroma CTBs in a CTU can have separate block tree structures (e.g., dual tree), and the partition case of the CTU using separate block tree structures is referred to as dual tree partition. When separate block tree mode (or dual tree) is applied, luma CTB is partitioned into CUs by a coding tree structure (luma coding tree structure), and the chroma CTBs are partitioned into chroma CUs by another coding tree structure (chroma coding tree structure). Thus, a CU in an I slice can include a coding block of the luma component (also referred to as luma CU in an example) or coding blocks of two chroma components (also referred to as chroma CUs), and a CU in a P or B slice always consists of coding blocks of all three color components unless the video is monochrome.

According to an aspect of the disclosure, in implementation of hardware video encoders and decoders, processing throughput drops when a picture has relatively more small intra blocks because of sample processing data dependency between neighboring intra blocks. The predictor generation of an intra block requires top and left boundary reconstructed samples from neighboring blocks. Therefore, intra prediction is generally sequentially processed block by block.

In some examples (e.g., HEVC), the smallest intra CU is limited to 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed. In some other examples (e.g., VVC), in order to improve worst case throughput, chroma intra CBs smaller than 16 chroma samples (size 2×2, 4×2, and 2×4) and chroma intra CBs with width smaller than 4 chroma samples (size 2×N) are disallowed by constraining the partitioning of chroma intra CBs.

In some examples, for the single coding tree, a smallest chroma intra prediction unit (SCIPU) is defined as a coding tree node whose chroma block size is larger than or equal to 16 chroma samples and has at least one child luma block smaller than 64 luma samples, or a coding tree node whose chroma block size is not 2×N and has at least one child luma block 4×N luma samples. In some examples, it is required that in each SCIPU, all CBs are coded based on inter prediction, or all CBs are coded based on non-inter prediction, i.e. either intra prediction or intra block copy (IBC). An SCIPU with all CBs coded based on inter prediction is referred to as inter SCIPU, and an SCIPU with all CBs coded based on non inter prediction is referred to a non-inter SCIPU. In case of a non-inter SCIPU, it is further required that chroma of the non-inter SCIPU shall not be further split and luma of the SCIPU is allowed to be further split. In this way, the small chroma intra CBs with size less than 16 chroma samples or with size 2×N are removed (disallowed). In addition, chroma scaling is not applied in case of a non-inter SCIPU. In some examples, no additional syntax is signaled, and whether a SCIPU is non-inter can be derived by the prediction mode of the first luma CB in the SCIPU. The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one flag before parsing the CUs in the SCIPU.

In some examples, for the separate tree structure in intra prediction picture, the 2×N intra chroma blocks are removed by disabling vertical binary and vertical ternary splits for 4×N and 8×N chroma partitions, respectively. The small chroma blocks with size 2×2, 4×2, and 2×4 are also removed (disallowed) by partitioning restrictions.

In some examples, in addition, a restriction on picture size is considered to avoid 2×2/2×4/4×2/2×N intra chroma blocks at the corner of pictures by considering the picture width and height to be multiple of max (8, MinCbSizeY).

In some examples (e.g., VVC), parallel coding methods, such as tile based parallel coding, wavefront based parallel coding are supported. In the tile based parallel coding, a picture can be split into several rectangular regions (tiles) so that the rectangular regions could be encoded or decoded in parallel. The wavefront based parallel coding is a CTU row based parallel coding method.

To allow parallel coding methods, both byte alignment and CABAC synchronization are necessary in some examples. For example (e.g., in VVC), syntax element sps_entropy_coding_sync_enabled_flag is used to indicate whether the byte alignment and CABAC synchronization are used.

Generally, luma CTBs and chroma CTBs are coded in a bitstream in an interleaved manner, namely a luma CTU is coded followed by a chroma CTU. In an example, luma CTBs and chroma CTBs can be coded in a bitstream in a sequence of luma CTB of a first CTU, chroma CTBs of the first CTU, luma CTB of a second CTU, chroma CTBs of the second CTU, etc.

In some examples, luma CTBs and chroma CTBs of the separate tree structure in VVC intra frames are coded in the interleaved manner. Such interleaved manner is not efficient for parallel encoding and decoding in some examples, because the luma CTBs and the chroma CTBs have to be processed sequentially even when there is no dependency between the luma CTBs and the chroma CTBs. It is even worse at decoder side as luma and chroma cannot be parsed in parallel due to the interleaved signaling, which degrade the performance of throughput for high resolution like 8K video.

In some examples, the separate tree structure scheme in VVC requires that the size of luma and chroma CTBs share the same size in the unit of luma pixel, which is less efficient for chroma coding.

In some examples, the separate tree structure scheme in VVC is only available in intra frames, which leads to a very complicated scheme SCIPU.

Aspects of the disclosure provide techniques for coding of luma CTBs and chroma CTBs in a non-interleaved manner. In some embodiments, for separate tree structure, at a certain level, such as in a picture level, a slice level, or a tile level, all luma CTBs are signaled before chroma CTBs, which is different from the interleaved manner in VVC. In an example, for separate tree structure, all luma CTBs in a picture are signaled (in a bitstream) before chroma CTBs in the picture. In another example, for separate tree structure, all luma CTBs in a slice are signaled (in a bitstream) before chroma CTBs in the slice. In another example, for separate tree structure, all luma CTBs in a tile are signaled (in a bitstream) before chroma CTBs in the tile. The non-interleaved manner can facilitate processing luma CTBs and chroma CTBs in parallel. In some examples, the separate tree structure is applied in intra prediction, and the non interleaved manner for luma CTBs and chroma CTBs can be used. In some other examples, the separate tree instruction is used in non-intra prediction, such as non-intra picture, non-intra slice, non intra tile and the like, and the non-interleaved manner for luma CTBs and chroma CTBs can be used.

In an embodiment, luma CTBs and chroma CTBs of a same slice/tile are signaled in a same network abstraction layer unit (NALU). Byte alignment is inserted after the signaling of all luma CTBs and before chroma CTBs in the NALU. In some examples, whether context adaptive binary arithmetic coding (CABAC) synchronization between luma CTBs and chroma CTBs is used can be determined based on a flag, such as sps_entropy_coding_sync_enabled_flag. For example, when the flag sps_entropy_coding_sync_enabled_flag is true, a synchronization can be performed on CABAC luma engine and chroma engine for a slice/tile or frame in some examples.

In another embodiment, luma CTBs and chroma CTBs may be put into different NALUs so that parallel parsing at decoder is possible. For example, luma CTBs of one or more tiles are included in a first NALU, and chroma CTBs of the one or more tiles are included in a second NALU. The decoder may include two or more processing cores that can respectively parse the first NALU and the second NALU.

In another embodiment, the size of luma CTB and the size of chroma CTB may be different in the unit of luma samples. In some related examples, such as VVC, when luma CTB has a size of 128×128 luma samples, the corresponding chroma CTB has to be the same size in luma samples, namely 128×128 chroma samples for color format 4:4:4, and 64×64 chroma samples for color format 4:2:0. In an embodiment of the present disclosure, even when luma CTB has a size of 128×128 luma samples, the corresponding chroma CTB could be 128×128 chroma samples for color format 4:2:0. In an example, for a region of 256×256 luma samples, when non-interleaved technique is used, luma portion can be coded using four 128×128 CTBs, and the chroma portion can be coded using one 128×128 (chroma samples) CTB for color format 4:2:0. Coding the chroma portion using CTB 128×128 chroma samples instead of 64×64 chroma samples improves coding efficiency.

In another embodiment, in a cross-component prediction, such as CCLM mode, luma predictions from different luma CTBs may be used to predict a chroma block, especially when additional filtering is used together with prediction. In some related examples, using luma prediction from different luma CTBs for a prediction of a chroma block in the CCLM mode is not allowed. According to present disclosure, using non interleaved separate tree, a prediction of chroma block in the CCLM mode can be performed using luma prediction from different luma CTBs.

In another embodiment, the QP for a chroma CU or a chroma TU may be signaled directly or derived from the QP(s) of collocated luma block(s). In some examples, a region of chroma CU or chroma TU can correspond to multiple luma CUs or luma TUs. When deriving chroma QP from luma CUs, if the chroma CU or chroma TU corresponds to multiple luma CUs or TUs, average QP, median QP, or the luma QP in a special order or position, such as the QP of the first collocated luma block (in a coding order), or the QP of the collocated center positioned luma block, may be used as chroma QP or the prediction of chroma QP.

In another embodiment (e.g., limited cache hardware implementation), to avoid unnecessary frequent loading of CTB level reconstructed/decoded pixels into cache, same CTB size in luma samples for luma and chroma channels are constrained. For example, luma processing channel and the chroma processing channel are constrained to process the same CTB size in luma samples. In some examples, encoding/decoding of chroma CTB n shall not be started until luma CTB n is finished, where n is the corresponding CTB index.

In another embodiment, CTU level control parameters, such as control parameters of sample adaptive offset (SAO), adaptive loop filter (ALF), cross-component adaptive loop filter (CCALF), are signaled for luma CTB and chroma CTB separately. In some examples, some parameters of chroma CTB may be derived or predicted from collocated luma CTBs. In an example, for some filtering tools, such as ALF, if the filter is turned off for collocate luma CTBs/blocks, the filter is turned off for chroma CTB/blocks. In another example, when ALF is turned off for a luma CTB/block, CCALF is turned off for the corresponding chroma CTB/block. In another example, a flag may be conditionally inferred to be turned off for a color component, for example a flag for chroma CTB is conditional inferred to be turned off based on luma CTB.

In another embodiment, luma and chroma tree may use different splitting tree structures. In an example, luma tree may use a combination of QT, BT and TT while chroma tree may use a combination of QT and BT.

In another embodiment, same size of maximal transform may be applied to luma and chroma blocks. For example, in a related example (e.g., VVC), for 4:2:0 profile, the maximal luma transform is 128×128 while maximal chroma transform is 64×64. Using non interleaved separate tree scheme, in an embodiment, 128×128 transform unit size may also be applied to both luma blocks and chroma blocks, and coding efficiency can be improved by using larger transform unit for the chroma blocks.

According to some aspects of the disclosure, the separate tree structure scheme can be used for non-intra picture/slice/tile, such as inter picture/slice/tile, IBC picture/slice/tile. In some examples, the separate tree structure scheme is used for all the prediction modes, thus the complicated local dual tree scheme SCIPU is not necessary.

In an embodiment, the minimum CU size for luma tree and chroma tree can be separately predefined. For example, the minimal CU size for luma tree is L×L luma samples, the minimal CU size for chroma tree is C×C chroma samples, where L and C are positive integers. In an example, L is 4. In another example, C is 4.

In another embodiment, the maximal and minimal luma tree sizes may be signaled in bitstream, such as in SPS, PPS, picture header, or slice header. In an example, the minimal luma tree size is signaled relative to 4×4 luma samples. A block size smaller than L×L luma samples (minimum CU size for luma tree is L×L luma samples) is not allowed.

In another embodiment, the maximal and minimal chroma tree sizes may be signaled in bitstream, such as in SPS, PPS, picture header, or slice header. A block size smaller than C×C chroma samples (minimum CU size for chroma tree is C×C chroma samples) is not allowed.

In some embodiments, for a chroma CU, no prediction mode (such as intra, inter, IBC) is signaled. The prediction mode of the chroma CU is derived from collocated luma CU(s). In an embodiment, the prediction mode of a chroma CU is derived based on the prediction mode of the first collocated luma CU in a coding order. In an example, the prediction mode of a chroma CU is the same as the prediction mode of the first collocated luma CU in a coding order, such as collocated luma CU at the top left corner of the chroma CU. In another embodiment, if the prediction mode of the first collocated luma CU is IBC, the prediction mode of chroma CU is intra. Otherwise (the prediction mode of the first collocated luma CU is not IBC), the prediction mode is the same as the prediction mode of the first collocated luma CU.

In some embodiments, a conforming constraint that all the collocated luma CUs of a chroma CU have to share the same prediction mode can be applied.

In another embodiment, the prediction mode of a chroma CU is derived based on the prediction mode of the first collocated luma CU if the chroma CU is not of the minimal chroma block sizes (in chroma sample). For a chroma CU of minimal chroma block sizes, the prediction mode is further signaled.

According to an aspect of the disclosure, for a chroma inter CU, the motion vectors can be derived from collocated luma blocks. In an embodiment, the motion vectors of a chroma CU are derived at the basis of 4×4 chroma samples. In an example, for each 4×4 chroma block (in chroma samples), the motion vector is set to the motion vector of the first collocated 4×4 luma block (in luma samples), or the average motion vector of all the collocated 4×4 luma blocks (in luma samples).

In some examples, a conforming constraint that if a 4×4 chroma block (in chroma samples) has more than one collocated 4×4 luma blocks (in luma samples), the maximum difference of the luma motion vectors in both horizontal and vertical directions is no more than a threshold can be applied. In an example, the threshold is one luma sample. In another example, the threshold is one chroma sample. In another example, if a chroma block does not meet the constraint, the chroma block has to be split. In another example, for a minimal chroma block which does not meet the constraint, it shall be signaled as intra.

According to an aspect of the disclosure, for a chroma IBC CU, block vectors are derived from collocated luma blocks. In some embodiments, the block vectors of a chroma CU are derived at the basis of 4×4 chroma samples. In an example, for each 4×4 chroma block (in chroma samples), the block vector is set to the motion vector of the first collocated 4×4 luma block (in luma samples), or the average block vector of all the collocated 4×4 luma blocks (in luma samples). Rounding average block vector to integer precision may be needed in some examples. The rounding may be toward zero, infinity (positive block vector to positive infinity, negative block vector to negative infinity), positive infinity, or negative infinity, In some embodiments, a conforming constraint that if a 4×4 chroma block (in chroma samples) has more than one collocated 4×4 luma blocks (in luma samples), the max difference of the luma block vectors in both horizontal and vertical directions is no more than a threshold can be applied. In an example, the threshold is one luma sample. In another example, the threshold is one chroma sample. In another example, if a chroma block does not meet the constraint, the chroma block has to be split. In another example, for a minimal chroma block which does not meet the constraint, intra prediction mode is signaled for the minimal chroma block.

Figure 20:
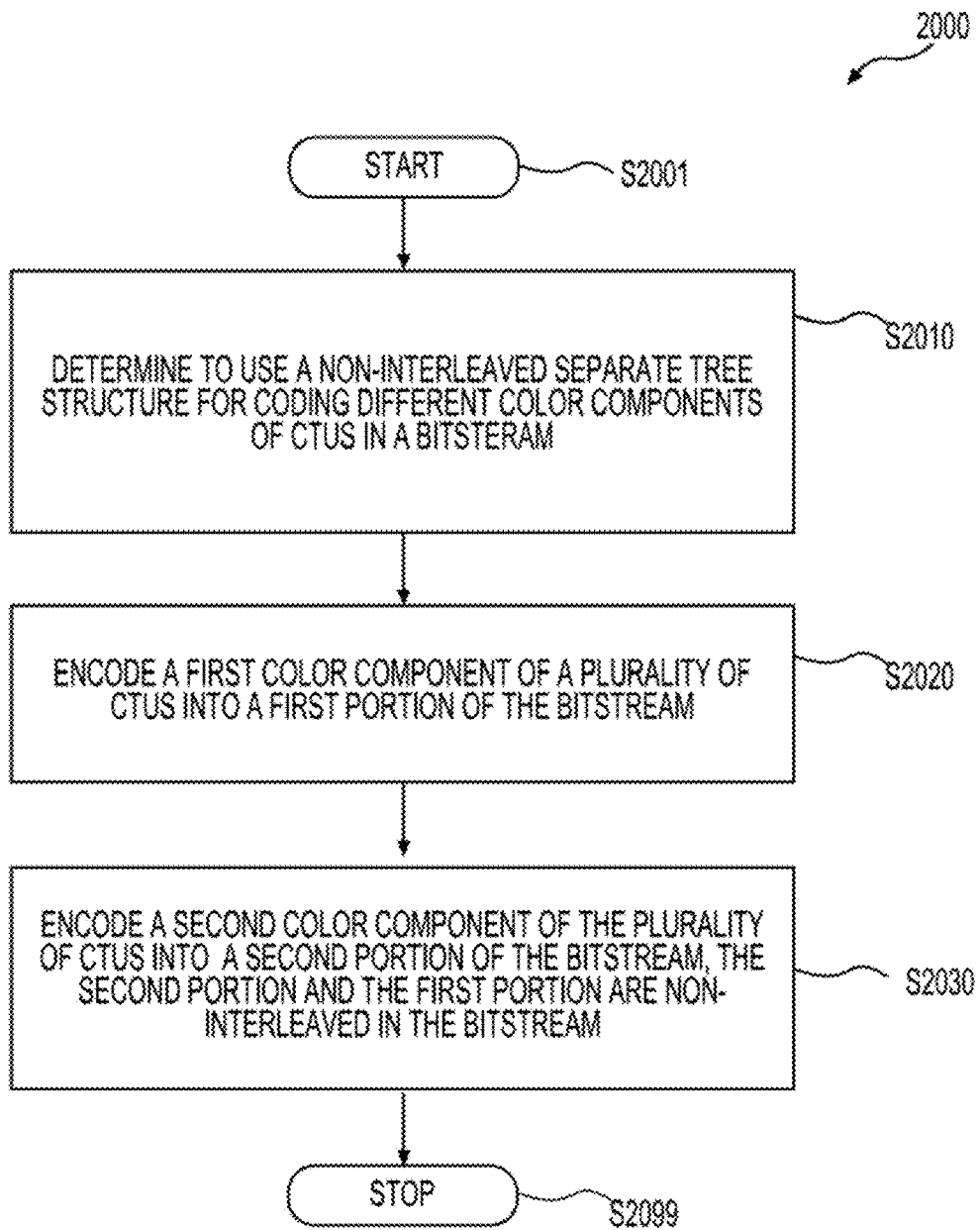
FIG. 20 shows a flow chart outlining a process according to some embodiment of the disclosure.

FIG. 20 shows a flow chart outlining a process (2000) according to an embodiment of the disclosure. The process (2000) can be used in a video encoder. In various embodiments, the process (2000) is executed by processing circuitry, such as the processing circuitry in the terminal devices (310), (320), (330) and (340), the processing circuitry that performs functions of the video encoder (403), the processing circuitry that performs functions of the video encoder (603), the processing circuitry that performs functions of the video encoder (703), and the like. In some embodiments, the process (2000) is implemented in software instructions, thus when the processing circuitry executes the software instructions, the processing circuitry performs the process (2000). The process starts at (S20301) and proceeds to (S2010).

At (S2010), a non-interleave separate tree structure is determined to use for coding different color components of CTUs in a bitstream.

At (S2020), a first color component of a plurality of CTUs is encoded into a first portion of the bitstream.

At (S2030), a second color component of the plurality of CTUs is encoded into a second portion of the bitstream. The first portion and the second portion are non-interleaved in the bitstream. For example, the second portion is located after the first portion in the bitstream, and is not interleaved with the first portion.

In some embodiments, the encoding of the first color component of the plurality of CTUs is performed in parallel with the encoding of the second color component of the plurality of CTUs.

In an example, the plurality of CTUs forms an intra picture (a picture coded using intra prediction). In another example, the plurality of CTUs forms an inter picture (a picture coded using inter prediction). In another example, the plurality of CTUs forms an intra block copy (IBC) picture (a picture coded using intra block copy). In another example, the plurality of CTUs forms an intra slice (a slice coded using intra prediction) in a picture. In another example, the plurality of CTUs forms an inter slice (a slice coded using inter prediction) in a picture. In another example, the plurality of CTUs forms an IBC slice (a slice coded using IBC) in a picture. In another example, the plurality of CTUs forms an intra tile (a tile coded using intra prediction) in a picture. In another example, the plurality of CTUs forms an inter tile (a tile coded using inter prediction) in a picture. In another example, the plurality of CTUs forms an IBC tile (a tile coded using IBC) in a picture.

In some examples, each CTU include a luma CTB of luma component, and two chroma CTBs of chroma components. In an example, luma CTBs of the plurality of CTUs are encoded into a first portion of a network abstraction layer unit (NALU) of the bitstream and chroma CTBs of the plurality of CTUs are encoded into a second portion of the NALU. In an example, byte alignment (one or more bits) can be inserted after the luma CTBs and before the chroma CTBs, so that the second portion of the NALU starts from an integer byte after the first portion in the NALU. In another example, a context-adaptive binary arithmetic coding (CABAC) synchronization between the luma CTBs and chroma CTBs may or may not performed based on a value of a sequence parameter set (SPS) synchronization flag, e.g., sps_entropy_coding_sync_enabled_flag.

In some examples, luma CTBs of the plurality of CTUs are encoded to form a first network abstraction layer unit (NALU) of the bitstream, and chroma CTBs of the plurality of CTUs are encoded to form form a second NALU of the bitstream.

In an example, the size of luma CTBand chroma CTB may be different in the unit of luma samples. In an example, when luma CTB includes 128×128 luma samples, a chroma CTB can include 128×128 chroma samples for a color format 4:2:0 which corresponds to 256×256 luma samples in the unit of luma samples.

In some examples, cross component prediction is used, and chroma samples in a chroma block can be predicted based on luma predictions from different luma CTBs, such as luma samples in at least a first luma CTB and a second luma CTB in the cross-component linear model (CCLM) mode.

In some embodiments, the QP value for a chroma CU (e.g., chroma coding block) or chroma TU (chroma transmit unit) is signaled directly or derived from QP s of collocated luma block(s). In an example, the QP value is derived based on a QP value of a first collocated luma block that can be decoded among the multiple luma blocks. In another example, the QP value is derived as an average QP value of the multiple luma blocks. In another example, the QP value is derived as a media QP value of the multiple luma blocks. In another example, the QP value is derived as a QP value of a center luma block that is collocated with a center position of the chroma block.

In some embodiments, to avoid unnecessary loading of CTB level reconstructed pixels, CTB size for luma processing channel and chroma processing channels is constrained to be the same in unit of luma samples. Thus, luma CTBs of a CTB size in luma samples are encoded in the luma processing channel, and chroma CTBs of the CTB size in luma samples are encoded in a chroma processing channel. In an example, encoding of a chroma CTB of a CTU can start after an encoding of a luma CTB of the CTU is finished.

In some examples, CTU level control parameters, such as sample adaptive offset (SAO), adaptive loop filter (ALF), cross-component adaptive loop filter (CCALF) are signaled for luma CTB and chroma CTB separately. For example, a CTU level control parameter of a luma CTB in a CTU is signaled in the bitstream for the luma CTB; and a CTU level control parameter of a chroma CTB in the CTU is signaled in the bitstream for the chroma CTB. In some examples, some parameters of the chroma CTBs can be derived based on collocated luma CTBs. For example, a CTU level control parameter of the chroma CTB is derived based on a collocated luma CTB.

In some examples, luma CTB and chroma CTBs can be partitioned using different splitting tree structures. In an example, a luma CTB of a CTU is partitioned using a first splitting tree structure (e.g., a combination of QT, BT and TT) and a chroma CTB is partitioned using a second splitting tree structure (e.g., a combination of QT and BT) that is different from the first splitting tree structure.

In an example, a maximal luma tree size (maximal luma CB size) is signaled in the bitstream. In another example, a minimal luma tree size (minimal luma CB size) is signaled in the bitstream. In another example, a maximal chroma tree size (maximal chroma CB size) is signaled in the bitstream. In another example, a minimal chroma tree size (minimal chroma CB size) is signaled in the bitstream.

In some examples, a prediction mode of a chroma CU is not signaled and is derived based on a collocated luma CU. In some examples, a prediction mode of a chroma CU is signaled in the bitstream in response to the chroma CU meets a minimal chroma block size requirement (the chroma CU has the minimal chroma block size).

In some examples, a chroma CU is a chroma inter CU (coded using inter prediction), and a motion vector of the chroma CU is derived based on motion vectors of collocated luma CUs (e.g., collocated luma blocks, collocated luma CBs).

In some examples, a chroma CU is a chroma IBC CU (coded using IBC), and a block vector of the chroma CU is derived based on block vectors of collocated luma CUs (e.g., collocated luma blocks, collocated luma CBs).

Then, the process proceeds to (S2099) and terminates.

The process (2000) can be suitably adapted. Step(s) in the process (2000) can be modified and/or omitted. Additional step(s) can be added. Any suitable order of implementation can be used.

Figure 21:
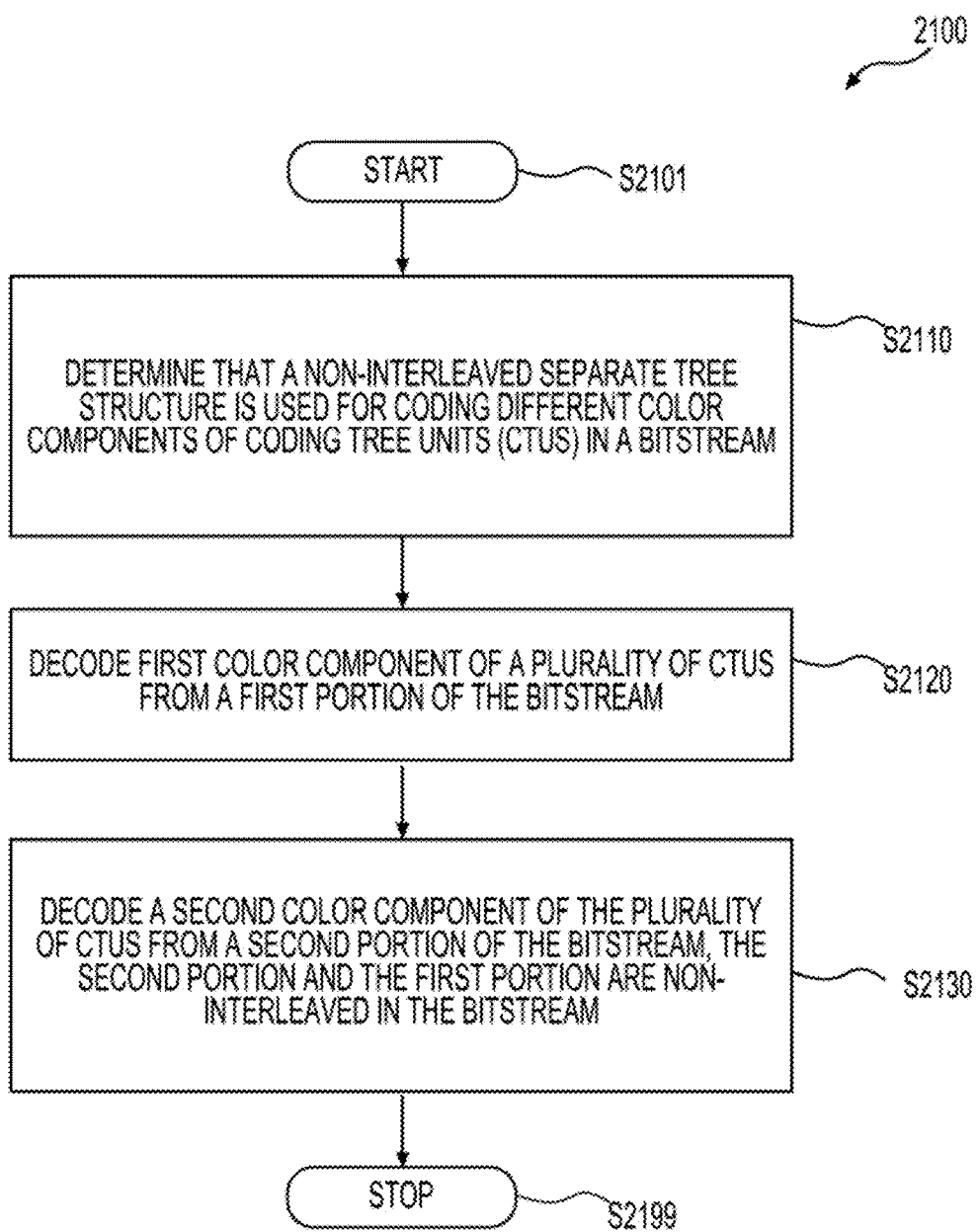
FIG. 21 shows a flow chart outlining another process according to some embodiment of the disclosure.

FIG. 21 shows a flow chart outlining a process (2100) according to an embodiment of the disclosure. The process (2100) can be used in a video decoder. In various embodiments, the process (2100) is executed by processing circuitry, such as the processing circuitry in the terminal devices (310), (320), (330) and (340), the processing circuitry that performs functions of the video decoder (410), the processing circuitry that performs functions of the video decoder (510), and the like. In some embodiments, the process (2100) is implemented in software instructions, thus when the processing circuitry executes the software instructions, the processing circuitry performs the process (2100). The process starts at (S2101) and proceeds to (S2110).

At (S2110), a bitstream is received and is determined that the bitstream uses a non-interleaved separate tree structure for coding different color components of coding tree units (CTUs) in a bitstream.

At (S2120), a first color component of a plurality of CTUs is decoded from a first portion of the bitstream.

At (S2130), a second color component of the plurality of CTUs is decoded from a second portion of the bitstream. The first portion and the second portion are non-interleaved in the bitstream, for example, the second portion is located after the first portion in the bitstream.

In some examples, the decoding of the first color component of the plurality of CTUs from the first portion of the bitstream is performed in parallel with the decoding of the second color component of the plurality of CTUs from the second portion of the bitstream.

In an example, the plurality of CTUs forms an intra picture (a picture coded using intra prediction). In another example, the plurality of CTUs forms an inter picture (a picture coded using inter prediction). In another example, the plurality of CTUs forms an intra block copy (IBC) picture (a picture coded using intra block copy). In another example, the plurality of CTUs forms an intra slice (a slice coded using intra prediction) in a picture. In another example, the plurality of CTUs forms an inter slice (a slice coded using inter prediction) in a picture. In another example, the plurality of CTUs forms an IBC slice (a slice coded using IBC) in a picture. In another example, the plurality of CTUs forms an intra tile (a tile coded using intra prediction) in a picture. In another example, the plurality of CTUs forms an inter tile (a tile coded using inter prediction) in a picture. In another example, the plurality of CTUs forms an IBC tile (a tile coded using IBC) in a picture.

In some examples, each CTU include a luma CTB of luma component, and two chroma CTBs of chroma components. In some examples, luma CTBs of the plurality of CTUs are decoded from a first portion of a network abstraction layer unit (NALU) in the bitstream; and chroma CTBs of the plurality of CTUs are decoded from a second portion of the NALU. In some embodiments, byte alignment is inserted between the luma and the chroma CTBs, and the second portion of the NALU starts from a integer byte after the first portion in the NALU. In some examples, whether to perform a context-adaptive binary arithmetic coding (CABAC) synchronization between the luma CTBs and the chroma CTBs is determined based on a value of a sequence parameter set (SPS) synchronization flag, such as sps_entropy_coding_sync_enabled_flag.

In some examples, a first network abstraction layer unit (NALU) of the bitstream is parsed and decoded to obtain luma CTBs of a plurality of CTUs, and a second NALU of the bitstream is parsed and decoded to obtain chroma CTBs of the plurality of CTUs. In an example, the parsing and decoding from the first NALU is in parallel with the parsing and decoding from the second NALU.

In some examples, the size of luma CTB and chroma CTB may be different in the unit of luma samples. In an example, a chroma CTB of a different size in luma samples from a luma CTB is decoded. In an example, when luma CTB includes 128×128 luma samples, a chroma CTB can include 128×128 chroma samples for a color format 4:2:0 which corresponds to 256×256 luma samples in the unit of luma samples. For example, at least a chroma CTB of 128×128 chroma samples for a color format 4:2:0 can be decoded.

In some examples, cross component prediction is used, and chroma samples in a chroma block can be predicted based on luma predictions from different luma CTBs, such as luma samples in at least a first luma CTB and a second luma CTB in the cross-component linear model (CCLM) mode.

In some embodiments, the QP value for a chroma CU (e.g., chroma coding block) or chroma TU (chroma transmit unit) is signaled directly or derived from QP s of collocated luma block(s). In some examples, multiple luma blocks that are collocated with a chroma block are determined. In an example, the QP value for the chroma CU is derived based on a QP value of a first collocated luma block that can be decoded among the multiple luma blocks. In another example, the QP value for the chroma CU is derived as an average QP value of the multiple luma blocks. In another example, the QP value for the chroma CU is derived as a media QP value of the multiple luma blocks. In another example, the QP value for the chroma CU is derived as a QP value of a center luma block that is collocated with a center position of the chroma block.

In some embodiments, to avoid unnecessary loading of CTB level reconstructed pixels, CTB size for luma processing channel and chroma processing channels is constrained to be the same in unit of luma samples. Thus, luma CTBs of a CTB size in luma samples are decoded in the luma processing channel, and chroma CTBs of the CTB size in luma samples are decoded in a chroma processing channel. In an example, decoding of a chroma CTB of a CTU can start after a decoding of a luma CTB of the CTU is finished.

In some examples, CTU level control parameters, such as sample adaptive offset (SAO), adaptive loop filter (ALF), cross-component adaptive loop filter (CCALF) are signaled for luma CTB and chroma CTB separately. For example, a CTU level control parameter of a luma CTB in a CTU is determined from signaling in the bitstream for the luma CTB; and a CTU level control parameter of a chroma CTB in the CTU is determined from signaling in the bitstream for the chroma CTB. In some examples, some parameters of the chroma CTBs can be derived based on collocated luma CTBs. For example, a CTU level control parameter of the chroma CTB is derived based on at least a collocated luma CTB.

In some examples, luma CTB and chroma CTBs can be partitioned using different splitting tree structures. In an example, a luma CTB of a CTU is partitioned into a luma tree using a first splitting tree structure (e.g., a combination of QT, BT and TT) and a chroma CTB is partitioned into a chroma tree using a second splitting tree structure (e.g., a combination of QT and BT) that is different from the first splitting tree structure.

In an example, a maximal luma tree size (maximal luma CB size) is determined based on signaling in the bitstream. In another example, a minimal luma tree size (minimal luma CB size) is determined based on signaling in the bitstream. In another example, a maximal chroma tree size (maximal chroma CB size) is determined based on signaling in the bitstream. In another example, a minimal chroma tree size (minimal chroma CB size) is determined based on signaling in the bitstream.

In some examples, a prediction mode of a chroma coding unit (CU) (coding unit in chroma tree, also referred to as chroma coding block) is not signaled and is derived based on a collocated luma CU (coding unit in luma tree. In some examples, a prediction mode of a chroma CU is determined based on signaling in the bitstream in response to the chroma CU meets a minimal chroma block size requirement (the chroma CU has the minimal chroma block size).

In some examples, a chroma CU is a chroma inter CU (coded using inter prediction), and a motion vector of the chroma CU is derived based on motion vectors of collocated luma CUs (e.g., collocated luma blocks, collocated luma CBs).

In some examples, a chroma CU is a chroma IBC CU (coded using IBC), and a block vector of the chroma CU is derived based on block vectors of collocated luma CUs (e.g., collocated luma blocks, collocated luma CBs).

Then, the process proceeds to (S2199) and terminates.

The process (2100) can be suitably adapted. Step(s) in the process (2100) can be modified and/or omitted. Additional step(s) can be added. Any suitable order of implementation can be used.

The techniques described above, can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
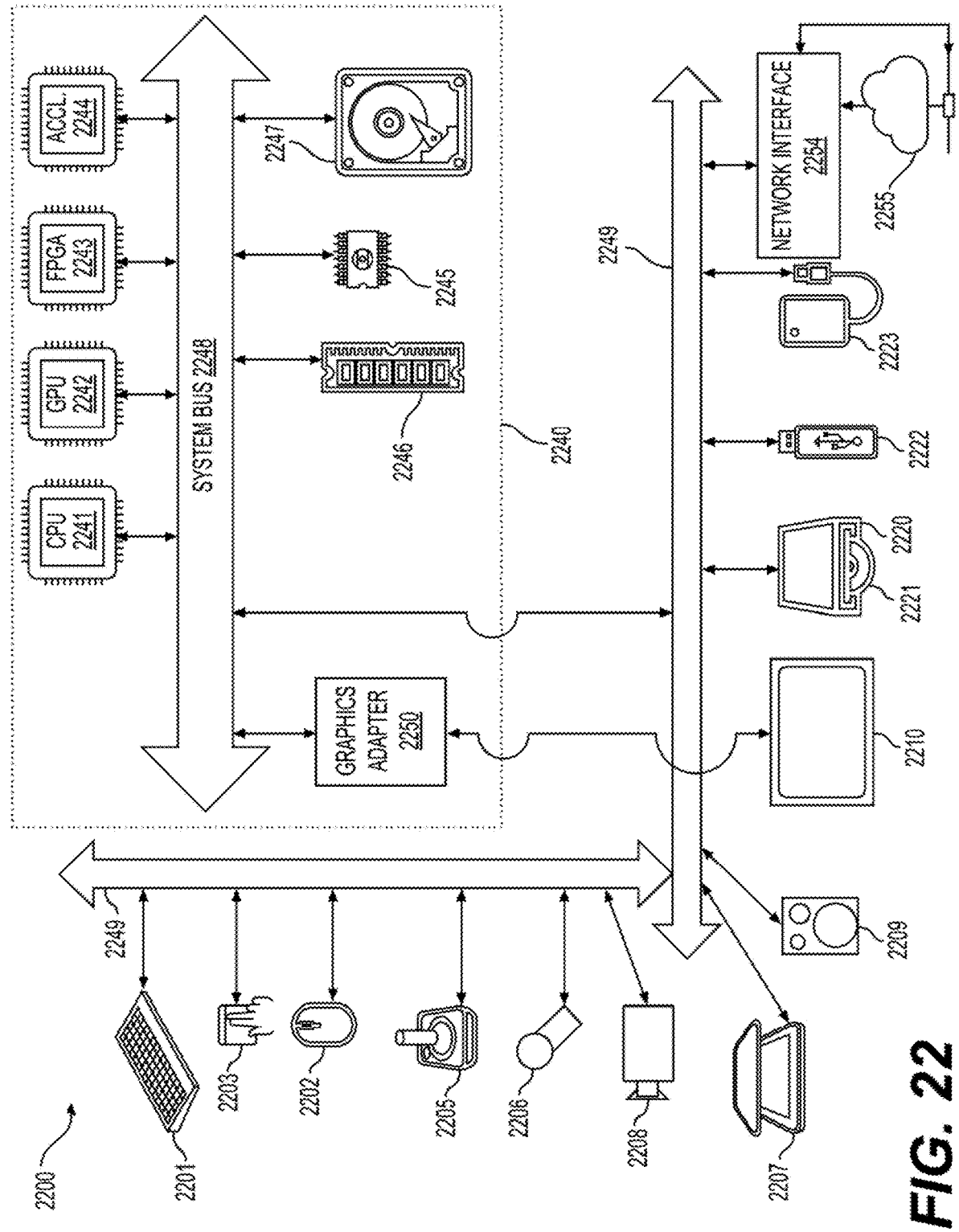
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be also be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video processing in a decoder, comprising:
determining that a non-interleaved separate tree structure is used for coding different color components of coding tree units (CTUs) in a bitstream;
decoding a first color component of a plurality of CTUs from a first portion of the bitstream; and
decoding a second color component of the plurality of CTUs from a second portion of the bitstream, the second portion being located after the first portion in the bitstream and the first portion and the second portion being non-interleaved and divided by color component such that all samples of the first color component of the plurality of CTUs are decoded from the first portion and all samples of the second color component of the plurality of CTUs are decoded from the second portion located after the first portion in the bitstream.

2. The method of claim 1, wherein the decoding of the first color component of the plurality of CTUs from the first portion of the bitstream is in parallel with the decoding of the second color component of the plurality of CTUs from the second portion of the bitstream.

3. The method of claim 1, wherein the plurality of CTUs forms one of an intra picture, an inter picture, an intra block copy (IBC) picture, an intra slice in a picture, an inter slice in a picture, an IBC slice in a picture, an intra tile in a picture, an inter tile in a picture, or an IBC tile in a picture.

4. The method of claim 1, wherein the decoding of the first color component of the plurality of CTUs and the decoding of the second color component of the plurality of CTUs further comprises:
decoding luma coding tree blocks (CTBs) of the plurality of CTUs from a first portion of a network abstraction layer unit (NALU) in the bitstream; and
decoding chroma CTBs of the plurality of CTUs from a second portion of the NALU.

5. The method of claim 4, wherein the second portion of the NALU starts from an integer byte after the first portion in the NALU.

6. The method of claim 4, further comprising:
performing a context-adaptive binary arithmetic coding (CABAC) synchronization between the luma CTBs and chroma CTBs based on a value of a sequence parameter set (SPS) synchronization flag.

7. The method of claim 1, wherein the decoding of the first color component of the plurality of CTUs and the decoding of the second color component of the plurality of CTUs further comprises:
parsing and decoding luma coding tree blocks (CTBs) of the plurality of CTUs from a first network abstraction layer unit (NALU) in the bitstream; and
parsing and decoding chroma CTBs of the plurality of CTUs from a second NALU in the bitstream.

8. The method of claim 7, wherein the parsing and decoding from the first NALU is performed in parallel with the parsing and decoding from the second NALU.

9. The method of claim 1, wherein the first color component of the plurality of CTUs corresponds to luma coding tree blocks (CTBs) of the plurality of CTUs, the second color component of the plurality of CTUs corresponds to chroma CTBs, and the method comprises:
decoding a chroma CTB of a different size in luma samples from a luma CTB.

10. The method of claim 1, further comprising:
predicting chroma samples in a chroma block based on luma samples in at least a first luma coding tree block (CTB) and a second luma CTB in a cross-component linear model (CCLM) mode.

11. The method of claim 1, further comprising:
determining multiple luma blocks that are collocated with a chroma block; and
deriving a quantization parameter (QP) value for the chroma block based on at least one of:
a QP value of a first collocated luma block that is decoded among the multiple luma blocks;
an average QP value of the multiple luma blocks;
a median QP value of the multiple luma blocks; or
a QP value of a center luma block that is collocated with a center position of the chroma block.

12. The method of claim 1, further comprising:
decoding luma coding tree blocks (CTBs) of a CTB size in luma samples in a luma processing channel; and
decoding chroma CTBs of the CTB size in luma samples in a chroma processing channel.

13. The method of claim 12, further comprising:
starting to decode a chroma CTB of a CTU after a decoding of a luma CTB of the CTU is finished.

14. The method of claim 1, further comprising:
determining a CTU level control parameter for a chroma coding tree block (CTB) based on at least one of:
signaling in the bitstream for the chroma CTB; and
deriving the CTU level control parameter for the chroma CTB based on a collocated luma CTB.

15. The method of claim 1, wherein a luma coding tree block (CTB) is partitioned using a first splitting tree structure and a chroma CTB is partitioned using a second splitting tree structure that is different from the first splitting tree structure.

16. The method of claim 1, further comprising at least one of:
   determining a maximal luma tree size from the bitstream;
   determining a minimal luma tree size from the bitstream;
   determining a maximal chroma tree size from the bitstream; or
   determining a minimal chroma tree size from the bitstream.

17. The method of claim 1, further comprising:
   deriving a prediction mode of a chroma coding unit (CU) based on a collocated luma CU.

18. The method of claim 17, further comprising:
   determining a prediction mode of a chroma CU based on a signal in the bitstream in response to the chroma CU meeting a minimal chroma block size requirement.

19. The method of claim 1, further comprising:
   deriving a motion vector of a chroma coding unit (CU) based on motion vectors of collocated luma CUs in response to the chroma CU being a chroma intra CU.

20. The method of claim 1, further comprising:
   deriving a block vector of a chroma coding unit (CU) based on block vectors of collocated luma CUs in response to the chroma CU being a chroma intra block copy (IBC) CU.

\* \* \* \* \*